(12) United States Patent
Miyazaki et al.

(10) Patent No.: US 9,023,928 B2
(45) Date of Patent: *May 5, 2015

(54) RUBBER COMPOSITIONS FOR BEAD APEX, SIDEWALL PACKING, BASE TREAD, BREAKER CUSHION, STEEL CORD TOPPING, STRIP ADJACENT TO STEEL CORDS, TIE GUM, AND SIDEWALL, AND PNEUMATIC TIRES

(71) Applicant: Sumitomo Rubber Industries, Ltd., Kobe (JP)

(72) Inventors: Tatsuya Miyazaki, Kobe (JP); Masanobu Nakamura, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/073,926

(22) Filed: Nov. 7, 2013

(65) Prior Publication Data

US 2014/0124113 A1 May 8, 2014

(30) Foreign Application Priority Data

Nov. 8, 2012 (JP) ................................. 2012-246389
Nov. 8, 2012 (JP) ................................. 2012-246390
Nov. 8, 2012 (JP) ................................. 2012-246392

(51) Int. Cl.
  *C08K 13/02* (2006.01)
  *B60C 1/00* (2006.01)
  (Continued)

(52) U.S. Cl.
  CPC . *C08K 13/02* (2013.01); *B60C 1/00* (2013.01); *B60C 1/0025* (2013.04);
  (Continued)

(58) Field of Classification Search
  CPC ............ C08K 3/04; C08K 13/02; C08K 5/09; C08L 9/06; C08L 7/00; B60C 1/00
  USPC .............. 524/284, 495, 496, 575.5, 526, 572, 524/396, 398, 166; 152/451, 537, 541, 450
  See application file for complete search history.

(56) References Cited

U.S. PATENT DOCUMENTS 4,820,751 A    4/1989 Takeshita et al.
5,173,135 A    12/1992 Tokieda et al.
(Continued)

FOREIGN PATENT DOCUMENTS

EP    0 080 451 A1    6/1983
EP    0 814 113 A2    12/1997
(Continued)

OTHER PUBLICATIONS

U.S. Appl. No. 14/073,921, filed Nov. 7, 2013, Miyazaki, et al.
(Continued)

*Primary Examiner* — Michael M Bernshteyn
(74) *Attorney, Agent, or Firm* — Oblon, McClelland, Maier & Neustadt, L.L.P.

(57) ABSTRACT

The present invention provides a rubber composition that improves in terms of the fuel economy of a rubber composition containing an isoprene-based rubber and also offers favorable durability and favorable processability or adhesion to steel cords, and a pneumatic tire formed from the rubber composition. The present invention relates to a rubber composition for a bead apex, sidewall packing, base tread, or breaker cushion, including: a specific rubber component; a specific amount of a specific carbon black; a specific amount of sulfur; and a specific amount of a compound represented by formula (I) below. The present invention also relates to a rubber composition for a steel cord topping, strip adjacent to steel cords, or tie gum, including: a specific rubber component; a specific amount of a specific carbon black; a specific amount of an organic acid cobalt salt; and a specific amount of a compound represented by the formula (I).

(I)

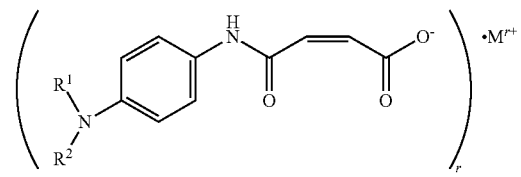

20 Claims, 3 Drawing Sheets

(51) Int. Cl.
  *C08K 3/04* (2006.01)
  *C08K 5/09* (2006.01)
  *C08L 7/00* (2006.01)

(52) U.S. Cl.
  CPC ... *Y10T 152/1081* (2015.01); *Y10T 152/10495* (2015.01); *C08K 3/04* (2013.01); *C08K 5/09* (2013.01); *C08L 7/00* (2013.01); *Y02T 10/862* (2013.01)

(56) References Cited

U.S. PATENT DOCUMENTS

| | | | |
|---|---|---|---|
| 8,440,757 | B2 | 5/2013 | Kushida |
| 2006/0247342 | A1 | 11/2006 | Da Silva et al. |
| 2010/0256258 | A1 | 10/2010 | Miyazaki |
| 2010/0294407 | A1 | 11/2010 | Kushida |
| 2014/0020808 | A1 | 1/2014 | Watanabe et al. |

FOREIGN PATENT DOCUMENTS

| | | | |
|---|---|---|---|
| EP | 1 568 735 A1 | 8/2005 | |
| EP | 1 726 615 A1 | 11/2006 | |
| EP | 2 165 855 A1 | 3/2010 | |
| JP | 64-020246 A | 1/1989 | |
| JP | 02-202936 A | 8/1990 | |
| JP | 2912845 B2 | 6/1999 | |
| JP | 2001-114939 A | 4/2001 | |
| JP | 2002-284927 | 10/2002 | |
| JP | 2005-271857 A | 10/2005 | |
| JP | 2006-273934 A | 10/2006 | |
| JP | 2006-328194 A | 12/2006 | |
| JP | 2007-197677 A | 8/2007 | |
| JP | 2008-31427 A | 2/2008 | |
| JP | 2008-156418 A | 7/2008 | |
| JP | 2009-155394 A | 7/2009 | |
| JP | 2010-184537 A | 8/2010 | |
| JP | 2010-188955 A | 9/2010 | |
| JP | 2011-252116 A | 12/2011 | |
| JP | 2012-87253 A | 5/2012 | |
| JP | 2012-122015 | 6/2012 | |
| JP | 2012-180386 A | 9/2012 | |
| JP | 2014-84312 A | 5/2014 | |
| WO | WO 2009/072560 A1 | 6/2009 | |
| WO | WO 2012/147984 A1 | 11/2012 | |
| WO | WO 2012147984 A1 * | 11/2012 | |

OTHER PUBLICATIONS

U.S. Appl. No. 14/073,931, filed Nov. 7, 2013, Nakamura, et al.

Yosuke Watanabe, et al., "Manufacture of rubber compositions for high fuel efficiency tires" Sumitomo Chemical Company, XP002718376, Nov. 2012, pp. 1-5.

Geum Ju Jung, "Sidewall rubber composition and tire manufactured by using the same" Hankook Tire Co., Ltd., XP002718505, Jun. 2012, pp. 1-2.

"Rubber Composition for Base Tread and Pneumatic Tire" WPI / Thomson Scientific, XP002718377, 2004, 2 pages.

* cited by examiner

RUBBER COMPOSITIONS FOR BEAD APEX, SIDEWALL PACKING, BASE TREAD, BREAKER CUSHION, STEEL CORD TOPPING, STRIP ADJACENT TO STEEL CORDS, TIE GUM, AND SIDEWALL, AND PNEUMATIC TIRES

TECHNICAL FIELD

The present invention relates to rubber compositions for a bead apex, sidewall packing, base tread, breaker cushion, steel cord topping, strip adjacent to steel cords, tie gum, and sidewall, and pneumatic tires including at least one selected from the group consisting of a bead apex, a sidewall packing, a base tread, a breaker cushion, a steel cord topping, a strip adjacent to steel cords, a tie gum, and a sidewall which are formed from the respective rubber compositions.

BACKGROUND ART

Recently, an increasing desire for better fuel economy of vehicles has demanded tire rubber compositions excellent in fuel economy. A known method for improving the fuel economy is to modify styrene butadiene rubber or butadiene rubber so as to promote dispersion of filler. An exemplary proposed modified rubber for silica formulation is a rubber having a terminal modified with an alkoxysilane containing a nitrogen functional group, and an exemplary proposed modified rubber for carbon black formulation is a terminal-modified butadiene rubber which is coupled with tin. Additionally, mercapto group-containing silane coupling agents disclosed in Patent Literature 1 are known to be highly reactive with silica and promote dispersion of silica.

However, all the above-mentioned techniques for improving the fuel economy are effective for styrene butadiene rubber or butadiene rubber, and the effect is not enough for isoprene-based rubbers such as natural rubber, highly purified natural rubber, isoprene rubber, and epoxidized natural rubber.

Tire rubber compositions generally contain isoprene-based rubbers together with styrene butadiene rubber or butadiene rubber. In particular, rubber compositions used for heavy-duty tires, which are required to have excellent rubber strength, mainly contain isoprene-based rubbers. Hence, effective techniques for improving the fuel economy of isoprene-based rubbers are desired.

Conventionally, sidewalls of pneumatic tires are formed from rubber compositions containing high unsaturation rubber such as natural rubber or isoprene rubber which has a high double-bond content in the main chain. Double bonds in such high unsaturation rubber molecules tend to react with ozone to cause depolymerization. If tires are left in a place exposed to strong UV light or in an atmosphere having a high ozone concentration in the air, cracking, so-called ozone cracking is caused. To avoid this phenomenon, rubber compositions for sidewalls contain ozone cracking inhibitors such as amine antioxidants or waxes.

Pneumatic tires including sidewalls formed from such rubber compositions containing ozone cracking inhibitors, however, have a dusty appearance due to blooming of the ozone cracking inhibitors on the sidewall surface during storage. In addition, amine antioxidants tend to turn their color to brown on exposure to the air or sunlight, and therefore the amine antioxidants migrated to the sidewall surface due to blooming discolor the sidewalls, lowering the commercial value of the tires. On the other hand, if the amount of antioxidant is reduced in order to reduce discoloration, cracks are formed earlier to lower the durability.

Ethylene-propylene-diene copolymers (EPDM) have fewer double bonds in the molecule, and are less likely to be attacked by oxygen, ozone, and the like. Accordingly, use of the EPDM in a sidewall provides a pneumatic tire capable of avoiding the occurrence of cracks on the tire surface to improve the durability, and also reducing the deterioration in appearance due to discoloration and the like (see Patent Literature 2, for example).

In cases where EPDM and a diene rubber are used in combination, however, a reinforcing filler such as carbon black or silica is dispersed preferentially in the diene rubber, and thus the reinforcement in the EPDM portion is lowered. In addition, since the reinforcing filler is concentrated in the diene rubber portion, more heat build-up tends to occur, that is, tan δ increases and therefore the fuel economy (the performance in terms of rolling resistance) is disadvantageously deteriorated. Thus, improvement in weather resistance, flex crack growth resistance and fuel economy in a balanced manner is needed.

CITATION LIST

Patent Literature

Patent Literature 1: JP-A 2012-122015
Patent Literature 2: JP-A 2002-284927

SUMMARY OF INVENTION

Technical Problem

The present invention aims to solve the above problems and provide a rubber composition for a bead apex, sidewall packing, base tread, or breaker cushion, which improves in terms of the fuel economy of a rubber composition containing an isoprene-based rubber and also offers favorable durability and processability, and a pneumatic tire including at least one selected from the group consisting of a bead apex, a sidewall packing, a base tread, and a breaker cushion, each formed from the rubber composition.

Also, the present invention aims to solve the above problems and provide a rubber composition for a steel cord topping, strip adjacent to steel cords, or tie gum, which improves in terms of the fuel economy of a rubber composition containing an isoprene-based rubber and also offers favorable durability and adhesion to steel cords, and a pneumatic tire including at least one selected from the group consisting of a topped steel cord component, a strip adjacent to steel cords and a tie gum, each formed from the rubber composition.

In addition, the present invention aims to solve the above problems and provide a rubber composition for a sidewall which improves in weather resistance, flex crack growth resistance, and fuel economy in a balanced manner and a pneumatic tire including a sidewall formed from the rubber composition.

Solution to Problem

A first aspect of the present invention relates to a rubber composition for a bead apex, sidewall packing, base tread, or breaker cushion, comprising: a rubber component; a carbon black having a nitrogen adsorption specific surface area of 20 to 90 m²/g; sulfur; and a compound represented by formula (I) below, wherein the rubber component contains 60 to 100% by mass of an isoprene-based rubber based on 100% by mass of the rubber component, an amount of the carbon black is 15 to 55 parts by mass and an amount of the sulfur is 1.8 to 3.0 parts by mass, each per 100 parts by mass of the rubber component, and an amount of the compound represented by the formula (I) is 0.1 to 20 parts by mass per 100 parts by mass of the carbon black,

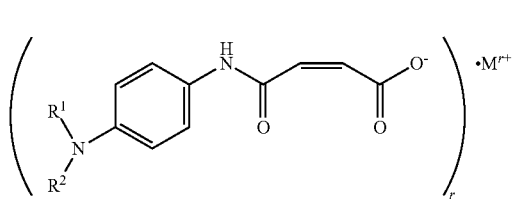

wherein $R^1$ and $R^2$ are the same as or different from each other and each represent a hydrogen atom, C1-C20 alkyl group, C1-C20 alkenyl group, or C1-C20 alkynyl group; $M^{r+}$ represents a metal ion; and r represents a valence of the metal ion.

The compound represented by the formula (I) is preferably a compound represented by the following formula (I-1), (I-2), or (I-3):

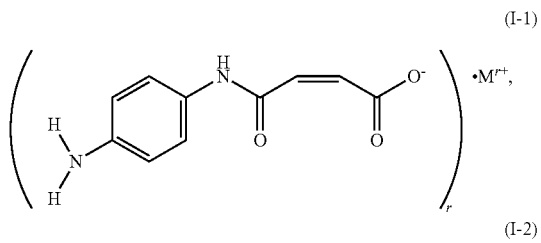

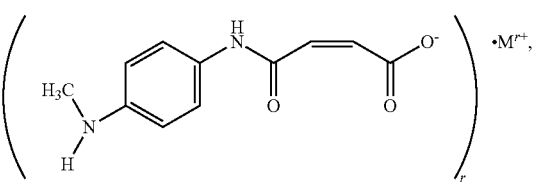

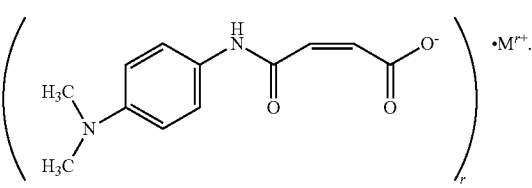

The metal ion is preferably a sodium, potassium, or lithium ion.

Preferably, the amount of the compound represented by the formula (I) is 0.5 to 10 parts by mass per 100 parts by mass of the carbon black, and the rubber component contains 90 to 100% by mass of the isoprene-based rubber based on 100% by mass of the rubber component.

The rubber composition is preferably for use in an all-steel radial tire having steel cords as ply cords.

An amount of oil is preferably at most 3 parts by mass per 100 parts by mass of the rubber component.

An amount of zinc oxide is preferably 3.0 to 10.0 parts by mass per 100 parts by mass of the rubber component.

The first aspect of the present invention also relates to a pneumatic tire, comprising at least one selected from the group consisting of a bead apex, a sidewall packing, a base tread, and a breaker cushion, each formed from the rubber composition.

A second aspect of the present invention relates to a rubber composition for a steel cord topping, strip adjacent to steel cords, or tie gum, comprising: a rubber component; a carbon black having a nitrogen adsorption specific surface area of 20 to 130 $m^2/g$; an organic acid cobalt salt; and a compound represented by the formula (I), wherein the rubber component contains 60 to 100% by mass of an isoprene-based rubber based on 100% by mass of the rubber component, an amount of the carbon black is 15 to 70 parts by mass and an amount of the organic acid cobalt salt, calculated as cobalt, is 0.05 to 0.20 parts by mass, each per 100 parts by mass of the rubber component, and an amount of the compound represented by the formula (I) is 0.1 to 20 parts by mass per 100 parts by mass of the carbon black.

The rubber composition preferably comprises sulfur in an amount of 2.5 to 6.0 parts by mass per 100 parts by mass of the rubber component.

The compound represented by the formula (I) is preferably a compound represented by the formula (I-1), (I-2), or (I-3).

The metal ion is preferably a sodium, potassium, or lithium ion.

Preferably, the carbon black has a nitrogen adsorption specific surface area of 60 to 130 $m^2/g$, the amount of the carbon black is 50 to 70 parts by mass per 100 parts by mass of the rubber component, and the amount of the compound represented by the formula (I) is 0.5 to 5 parts by mass per 100 parts by mass of the carbon black.

The rubber composition preferably comprises a compound represented by formula (II) below in an amount of 0.1 to 5.0 parts by mass per 100 parts by mass of the rubber component, $$XO_3S-S-(CH_2)_q-S-SO_3X \qquad (II)$$

wherein q represents an integer of 3 to 10, and X represents lithium, potassium, sodium, magnesium, calcium, barium, zinc, nickel, or cobalt.

Preferably, the rubber composition comprises at least one cross-linkable resin selected from the group consisting of resorcinol resins, modified resorcinol resins, cresol resins, modified cresol resins, phenolic resins, and modified phenolic resins, and at least one methylene donor selected from the group consisting of partial condensates of hexamethoxymethylolmelamine and partial condensates of hexamethylol melamine pentamethyl ether, wherein a total amount of the at least one cross-linkable resin is 0.5 to 10 parts by mass and a total amount of the at least one methylene donor is 0.5 to 10 parts by mass, each per 100 parts by mass of the rubber component.

The rubber composition preferably comprises a silica having a nitrogen adsorption specific surface area of 50 to 250 $m^2/g$ in an amount of 3 to 55 parts by mass per 100 parts by mass of the rubber component.

The second aspect of the present invention also relates to a pneumatic tire, comprising at least one selected from the group consisting of a topped steel cord component, a strip adjacent to steel cords, and a tie gum, each formed from the rubber composition.

A third aspect of the present invention relates to a rubber composition for a sidewall, comprising: a rubber component; a carbon black having a nitrogen adsorption specific surface area of 30 to 120 $m^2/g$; and a compound represented by the formula (I), wherein the rubber component contains, based on 100% by mass of the rubber component, 60 to 75% by mass of a diene rubber and 25 to 40% by mass of a low unsaturation copolymer, an amount of the carbon black is 20 to 60 parts by mass per 100 parts by mass of the rubber component, and an amount of the compound represented by the formula (I) is 0.5 to 20 parts by mass per 100 parts by mass of the carbon black.

The copolymer is preferably at least one of an ethylene-propylene-diene copolymer (EPDM) and a brominated copolymer of isobutylene and p-methylstyrene.

The compound represented by the formula (I) is preferably a compound represented by the formula (I-1), (I-2), or (I-3).

The metal ion is preferably a sodium, potassium, or lithium ion.

The third aspect of the present invention also relates to a pneumatic tire, comprising a sidewall formed from the rubber composition.

Advantageous Effects of Invention

According to the first aspect of the present invention, since the rubber composition for a bead apex, sidewall packing, base tread, or breaker cushion contains an isoprene-based rubber, a specific carbon black, sulfur, and a compound represented by the formula (I) each in a predetermined amount, a pneumatic tire formed therefrom has fuel economy, durability and processability that are improved in a balanced manner.

According to the second aspect of the present invention, since the rubber composition for a steel cord topping, strip adjacent to steel cords, or tie gum contains an isoprene-based rubber, a specific carbon black, an organic acid cobalt salt, and a compound represented by the formula (I) each in a predetermined amount, a pneumatic tire formed therefrom has fuel economy, durability and adhesion to steel cords that are improved in a balanced manner.

According to the third aspect of the present invention, since the rubber composition for a sidewall contains a specific rubber component, a specific carbon black, and a compound represented by the formula (I) each in a predetermined amount, a pneumatic tire formed therefrom has weather resistance, flex crack growth resistance and fuel economy that are improved in a balanced manner.

Figure 1:
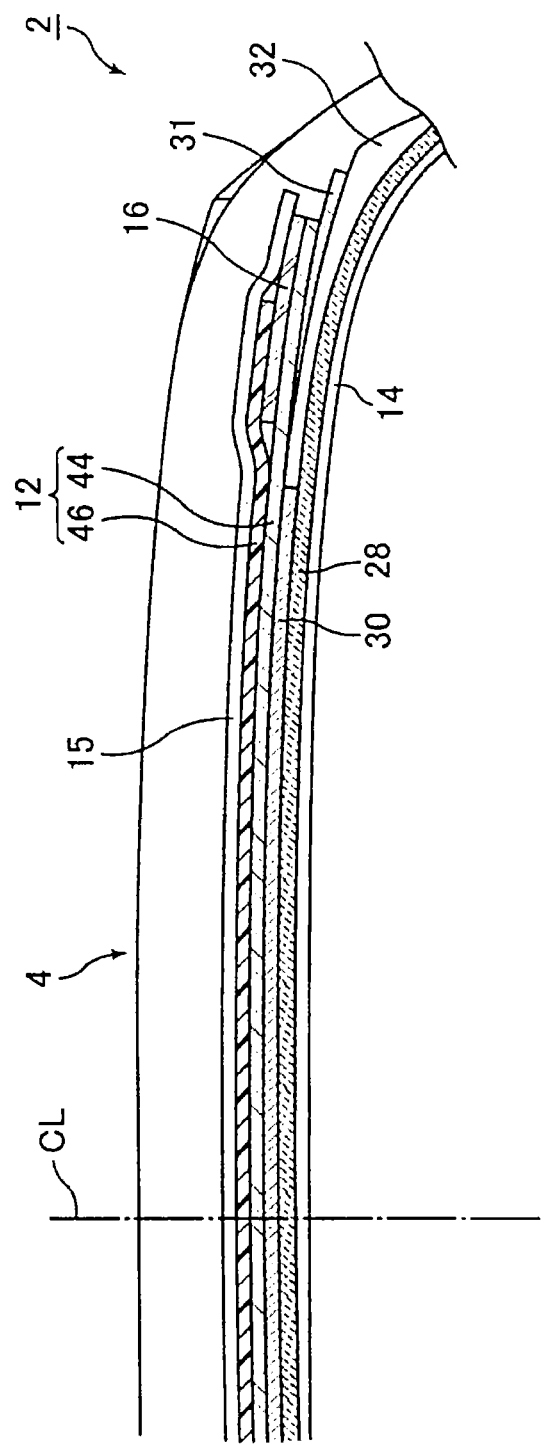
FIG. 1 is an exemplary partial cross sectional view of a pneumatic tire.

DESCRIPTION OF EMBODIMENTS (First Aspect of the Present Invention)

The rubber composition of the first aspect of the present invention contains an isoprene-based rubber, a specific carbon black, sulfur, and a compound represented by the formula (I). The compound represented by the formula (I) binds to carbon black by a reaction of its terminal nitrogen functional group with a functional group, such as a carboxyl group, present on the surface of carbon black. Also, its carbon-carbon double bond site binds to polymers by a reaction with polymer radicals or a reaction involving sulfur crosslinking. Therefore, the dispersibility of carbon black can be improved and this favorable dispersion state can be maintained during service. In addition, the polymers restrict the carbon black via the compound represented by the formula (I), and therefore heat build-up can be suppressed. The addition of the compound represented by the formula (I), which provides these effects, together with a specific carbon black and sulfur to a rubber composition containing an isoprene-based rubber improves the fuel economy of the rubber composition and provides favorable durability and processability.

The rubber composition according to the first aspect of the present invention contains an isoprene-based rubber as the rubber component. The isoprene-based rubber has its polymer chains cleaved during kneading to generate radicals. The compound represented by the formula (I) captures the generated radicals, so that the polymer chains and the compound represented by the formula (I) are bound to each other.

Examples of the isoprene-based rubber include natural rubber (NR), isoprene rubber (IR), epoxidized natural rubber (ENR), and highly purified natural rubber (HPNR). NR can be suitably used.

The amount of the isoprene-based rubber based on 100% by mass of the rubber component is at least 60% by mass, preferably at least 90% by mass, and may be 100% by mass. If the amount is less than 60% by mass, the fuel economy may not be improved sufficiently.

The rubber composition of the first aspect of the present invention may contain other rubbers in addition to the isoprene-based rubber. Examples of other rubbers include diene rubbers such as butadiene rubber (BR), styrene butadiene rubber (SBR), chloroprene rubber (CR), styrene isoprene butadiene rubber (SIBR), styrene isoprene rubber (SIR), and isoprene butadiene rubber. From the standpoint of improving the crack growth resistance and suppressing reversion, BR is preferred.

The BR is not particularly limited, and BR commonly used in the tire industry may be used. The BR is preferably at least one selected from the group consisting of syndiotactic crystal-containing butadiene rubbers (SPB-containing BR), rare-earth butadiene rubbers (rare-earth BR) synthesized in the presence of a rare earth element catalyst, and tin-modified butadiene rubbers (tin-modified BR). Rare-earth BR is more preferred. The rare-earth BR may suitably be one synthesized in the presence of a rare earth element catalyst and having a vinyl content of at most 1.0% by mass (preferably at most 0.8% by mass) and a cis content of at least 95% by mass.

In the present invention, the vinyl content (1,2-butadiene unit content) and cis content (cis-1,4-butadiene unit content) are measured by infrared absorption spectrometry.

In the case where the rubber composition of the first aspect of the present invention contains BR, the amount of BR based on 100% by mass of the rubber component is preferably 10 to 40% by mass, and more preferably 10 to 20% by mass.

The rubber composition of the first aspect of the present invention contains a carbon black having a predetermined nitrogen adsorption specific surface area.

The carbon black has a nitrogen adsorption specific surface area ($N_2SA$) of at least 20 $m^2/g$, preferably at least 30 $m^2/g$, and more preferably at least 35 $m^2/g$. If the $N_2SA$ is less than 20 $m^2/g$, sufficient durability (Hs and elongation at break) may not be secured. The carbon black has an $N_2SA$ of at most 90 $m^2/g$, preferably at most 70 $m^2/g$, and more preferably at most 55 $m^2/g$. If the $N_2SA$ is more than 90 $m^2/g$, the heat build-up due to carbon black may become greater and the reaction with the compound represented by the formula (I) is less likely to progress, likely leading to insufficient improvement of the fuel economy.

The carbon black preferably has a dibutyl phthalate (DBP) oil absorption of at least 65 $cm^3/100$ g, more preferably at least 80 $cm^3/100$ g. If the DBP oil absorption is less than 65 $cm^3/100$ g, sufficient Hs and elongation at break may not be secured. The carbon black preferably has a DBP oil absorption of at most 120 cm³/100 g. If the DBP oil absorption is more than 120 cm³/100 g, sufficient fuel economy may not be secured.

The carbon black preferably has a pH of at most 7.9, more preferably at most 7.8, still more preferably at most 7.7, and particularly preferably at most 7.6. If the pH is higher than 7.9, such carbon black may contain only a small amount of acidic functional groups; therefore, the reactivity (interaction) between the carbon black and the compound represented by the formula (I) may be small, failing to achieve sufficient improvement in fuel economy and the like. The carbon black preferably has a pH of at least 3.0, more preferably at least 3.5. If the pH is lower than 3.0, the pH of the rubber composition tends to be low and thus the activity of vulcanizing agents tends to be reduced to lower the crosslinking efficiency.

The carbon black preferably has a volatile content of at least 0.8% by mass, more preferably at least 0.9% by mass, and still more preferably at least 1.0% by mass. If the volatile content is less than 0.8% by mass, the reactivity (interaction) with the compound represented by the formula (I) may be small, failing to sufficiently improve the fuel economy and the like. The volatile content of the carbon black is preferably at most 3.5% by mass, and more preferably at most 3.0% by mass. If the volatile content is more than 3.5% by mass, in the vulcanization step, vulcanization needs to be continued until the volatile portions mostly volatilize so that pores are not formed. As a result, the vulcanization time tends to be prolonged to deteriorate the productivity.

The DBP oil absorption, pH, and volatile content of carbon black herein are measured by methods in conformity with JIS K6221 (1982), and the $N_2SA$ of carbon black is measured by a method in conformity with JIS K6217 (2001).

The amount of the carbon black per 100 parts by mass of the rubber component is at least 15 parts by mass, preferably at least 25 parts by mass. If the amount is less than 15 parts by mass, sufficient Hs may not be secured. The amount of the carbon black is at most 55 parts by mass, preferably at most 50 parts by mass, and more preferably at most 45 parts by mass. If the amount is more than 55 parts by mass, the heat build-up may become so great that the fuel economy and processability can be deteriorated.

The rubber composition of the first aspect of the present invention contains a compound represented by the following formula (I):

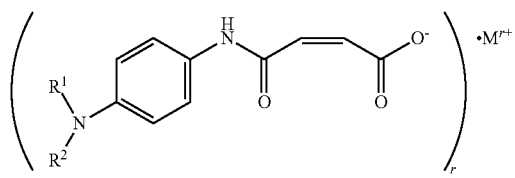

(I)

wherein $R^1$ and $R^2$ are the same as or different from each other, and each represent a hydrogen atom, a C1-C20 alkyl group, a C1-C20 alkenyl group, or a C1-C20 alkynyl group; $M^{r+}$ represents a metal ion; and r represents a valence of the metal ion.

Examples of the alkyl group represented as $R^1$ and $R^2$ include methyl, ethyl, n-propyl, isopropyl, n-butyl, sec-butyl, and tert-butyl groups.

Examples of the alkenyl group represented as $R^1$ and $R^2$ include vinyl, allyl, 1-propenyl, and 1-methylethenyl groups.

Examples of the alkynyl group represented as $R^1$ and $R^2$ include ethynyl and propargyl groups.

The $R^1$ and $R^2$ are each preferably a hydrogen atom or an alkyl group, more preferably a hydrogen atom or a methyl group, and still more preferably a hydrogen atom. In other words, the compound represented by the formula (I) is preferably a compound represented by the following formula (I-1), (I-2), or (I-3), and is more preferably a compound represented by the formula (I-1).

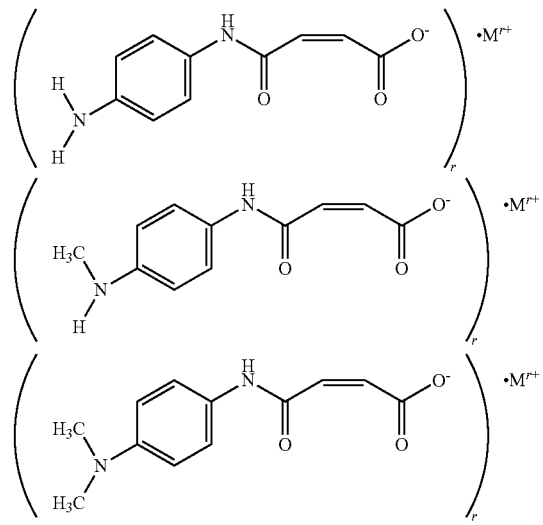

In the formulae (I), (I-1), (I-2), and (I-3), the metal ion may be a sodium, potassium, or lithium ion, and is preferably a sodium ion.

The amount of the compound represented by the formula (I) per 100 parts by mass of the carbon black is at least 0.1 parts by mass, preferably at least 0.5 parts by mass, and more preferably at least 1 part by mass. If the amount is less than 0.1 parts by mass, the fuel economy may not be sufficiently improved. The amount of the compound represented by the formula (I) is at most 20 parts by mass, preferably at most 10 parts by mass, and more preferably at most 5 parts by mass. If the amount is more than 20 parts by mass, sufficient processability may not be secured.

The rubber composition of the first aspect of the present invention contains sulfur. The sulfur is not particularly limited, and sulfur commonly used in the tire industry may be used.

In the case of an all-steel radial tire having steel cords as ply cords, a topping rubber for covering the ply cords contains a larger amount of sulfur for securing adhesion to the ply cords, as compared to the case of a tire having fiber cords as ply cords. In general, the amount of sulfur in a steel cord topping rubber is 4 to 6 parts by mass, whereas the amount of sulfur in a fiber cord topping rubber is 2 to 3.5 parts by mass. Hence, in a bead apex, sidewall packing, base tread, and breaker cushion which are adjacent to the ply, the amount of sulfur needs to be determined in consideration of the migration of sulfur. From this standpoint, the amount of sulfur per 100 parts by mass of the rubber component is at least 1.8 parts by mass, preferably at least 2.0 parts by mass. If the amount is less than 1.8 parts by mass, the amount of sulfur migrated from the ply may become too great. In addition, the rubber composition may not be sufficiently cured and thus fail to have the required hardness and elongation at break. As a result, the required durability may not be achieved. The amount of sulfur is at most 3.0 parts by mass. If the amount is more than 3.0 parts by mass, curing caused by oxidative degradation may be promoted, lowering the durability.

The amount of sulfur refers to the total amount including sulfur derived from sulfur-containing coupling agents such as DURALINK HTS produced by Flexsys.

The rubber composition of the first aspect of the present invention preferably contains zinc oxide. The zinc oxide is not particularly limited, and zinc oxide commonly used in the tire industry may be used.

The amount of zinc oxide per 100 parts by mass of the rubber component is preferably at least 3.0 parts by mass, and more preferably at least 3.5 parts by mass. If the amount is less than 3.0 parts by mass, the processability and durability (in particular, durability after oxidative degradation) may be lowered. The amount of zinc oxide is preferably at most 10.0 parts by mass, and more preferably at most 6.0 parts by mass. If the amount is more than 10.0 parts by mass, agglomerates of zinc oxide may serve as fracture nuclei and therefore favorable elongation at break may not be achieved.

The rubber composition of the first aspect of the present invention preferably contains a C5 petroleum resin as a tackifier processing aid. C5 petroleum resins are prepared by polymerization of C5 (carbon number: 5) petroleum hydrocarbons. The C5 petroleum hydrocarbons refers to C5 fraction (fraction having a carbon number of 5) obtained by pyrolysis of naphtha. Specific examples thereof include diolefins such as isoprene, 1,3-pentadiene, dicyclopentadiene, and piperylene, and monoolefins such as 2-methyl-1-butene, 2-methyl-2-butene, and cyclopentene. The amount of the C5 petroleum resin is preferably 0 to 5 parts by mass, and more preferably 0 to 3 parts by mass, per 100 parts by mass of the rubber component.

The rubber composition of the first aspect of the present invention preferably contains at least one of a compound represented by the following formula (II) and its hydrate, as a crosslinking agent,

$$XO_3S-S-(CH_2)_q-S-SO_3X \quad (II)$$

wherein q represents an integer of 3 to 10, and X represents lithium, potassium, sodium, magnesium, calcium, barium, zinc, nickel, or cobalt.

In the formula (II), q is preferably an integer of 3 to 6. X is preferably potassium or sodium. Exemplary hydrates of the compound represented by the formula (II) include sodium salt monohydrates and sodium salt dihydrates. The hydrate is preferably sodium hexamethylene-1,6-bisthiosulfate dihydrate.

In the case where the rubber composition of the first aspect of the present invention contains the compound represented by the formula (II) and/or its hydrate, the amount thereof is preferably 0.2 to 5 parts by mass, and more preferably 0.5 to 3 parts by mass, per 100 parts by mass of the rubber component.

The rubber composition of the first aspect of the present invention may appropriately contain, in addition to the above components, compounding agents commonly used in production of rubber compositions, such as reinforcing fillers (e.g., silica), silane coupling agents, antioxidants, oils, waxes, and vulcanization accelerators.

The amount of oil per 100 parts by mass of the rubber component is preferably at most 3 parts by mass, and more preferably at most 2 parts by mass. If the amount is more than 3 parts by mass, the reaction between the compound represented by the formula (I) and the functional group present on the carbon black surface may be inhibited. In addition, oil may be migrated to a steel cord topping rubber and thereby reduce adhesion to cords, possibly causing reduction in durability. The lower limit of the amount of oil is not particularly limited, and is preferably at least 1 part by mass.

The rubber composition of the first aspect of the present invention may be prepared by any known method, for example, by kneading the components with a known mixer such as a roll mill or Banbury mixer.

The rubber composition of the first aspect of the present invention can be used for bead apexes, sidewall packings, base treads, and breaker cushions for tires (preferably all-steel radial tires). The breaker cushion formed from the rubber composition of the present invention is suitable for heavy-duty tires.

Figure 2:
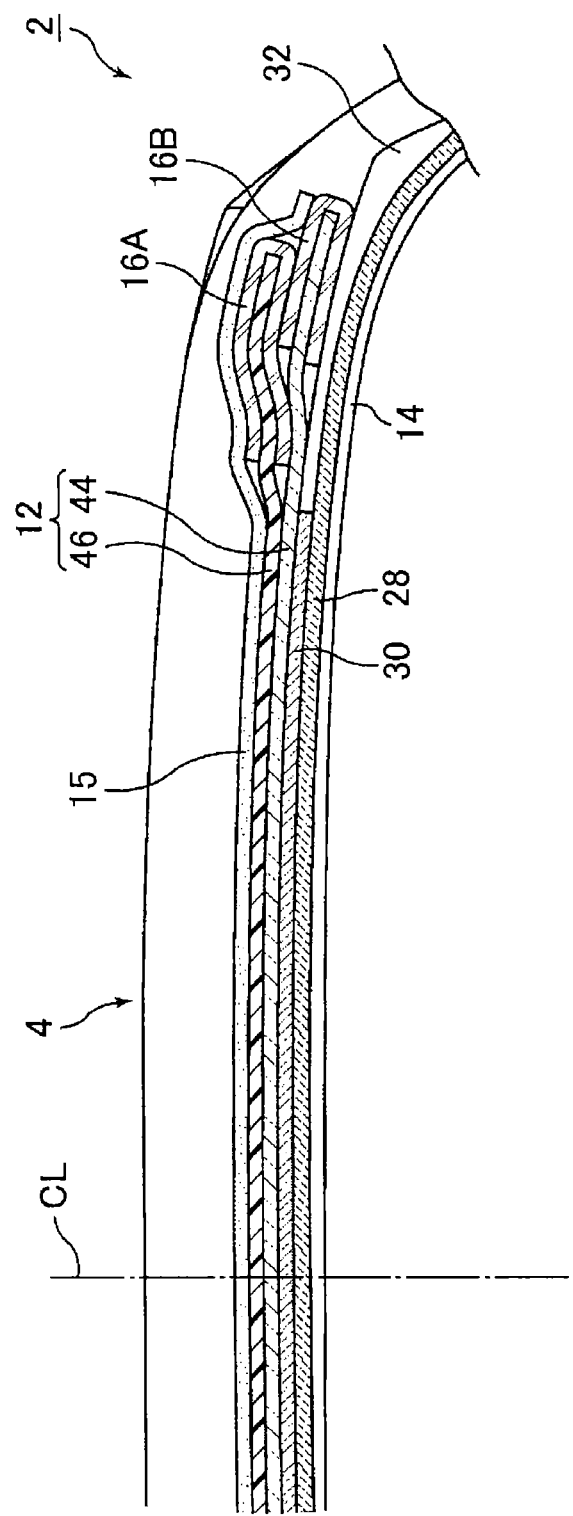
FIG. 2 is an exemplary partial cross sectional view of anther pneumatic tire.
Figure 3:
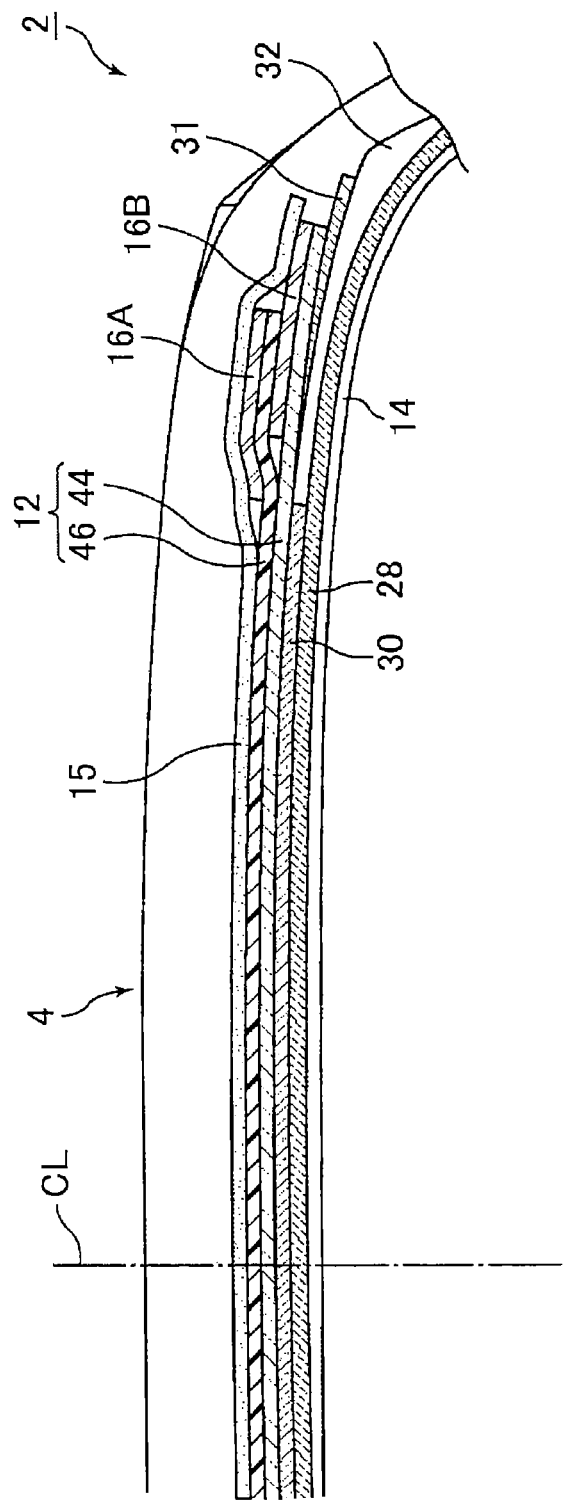
FIG. 3 is an exemplary partial cross sectional view of another pneumatic tire.

A bead apex is a triangular component radially extending from the top of a bead core to around the maximum breadth portion, and is specifically shown in FIGS. 1 to 3 of JP-A 2008-38140 (which is incorporated by reference in the entirety) and the like.

A sidewall packing is also referred to as a soft bead apex, and is a component tapering radially outwardly from the bead apex, and is specifically shown in FIG. 1 of JP-A 2005-271857 (which is incorporated by reference in the entirety) and the like.

A base tread is an inner layer of a tread that has a multilayer structure, and is an inner surface layer in the case of a tread having a two-layer structure (outer surface layer (cap tread) and inner surface layer (base tread)).

A breaker cushion is a component provided between the edge of a breaker and a carcass (case), and is specifically shown in FIG. 1 of JP-A 2006-273934 (which is incorporated by reference in the entirety) and the like.

The pneumatic tire of the first aspect of the present invention can be produced from the rubber composition by a conventional method. Specifically, an unvulcanized rubber composition appropriately containing various additives is extruded into the shape of a bead apex or other tire components, and then arranged in an ordinary manner and assembled with other tire components in a tire building machine to prepare an unvulcanized tire. The unvulcanized tire is pressurized under heat in a vulcanizer to form a pneumatic tire of the present invention.

The pneumatic tire of the first aspect of the present invention can be used as a tire for passenger vehicles, a heavy-duty tire, and the like. Particularly, the pneumatic tire can be suitably used as a heavy-duty tire containing a large amount of isoprene-based rubber.

(Second Aspect of the Present Invention)

The rubber composition of the second aspect of the present invention contains an isoprene-based rubber, a specific carbon black, an organic acid cobalt salt, and a compound represented by the formula (I). The compound represented by the formula (I) binds to carbon black by a reaction of its terminal nitrogen functional group with a functional group, such as a carboxyl group, present on the surface of carbon black. Also, its carbon-carbon double bond site binds to polymers by a reaction with polymer radicals or a reaction involving sulfur crosslinking. Therefore, the dispersibility of carbon black can be improved and this favorable dispersion state can be maintained during service. In addition, the polymers restrict the carbon black via the compound represented by the formula (I), and therefore heat build-up can be suppressed. The addition of the compound represented by the formula (I), which provides these effects, together with a specific carbon black and an organic acid cobalt salt to a rubber composition containing an isoprene-based rubber improves the fuel economy of the rubber composition and provides favorable durability and adhesion to steel cords. Though the use of the compound represented by the formula (I) tends to accelerate the curing rate to some extent, the influence on the adhesion to steel cords is slight.

The rubber composition of the second aspect of the present invention contains an isoprene-based rubber as the rubber component. The isoprene-based rubber has its polymer chains cleaved during kneading to generate radicals. The compound represented by the formula (I) captures the generated radicals, so that the polymer chains and the compound represented by the formula (I) are bound to each other.

Examples of the isoprene-based rubber include natural rubber (NR), isoprene rubber (IR), epoxidized natural rubber (ENR), and highly purified natural rubber (HPNR). NR can be suitably used.

The amount of the isoprene-based rubber based on 100% by mass of the rubber component is at least 60% by mass, preferably at least 90% by mass, and may be 100% by mass. If the amount is less than 60% by mass, the fuel economy may not be sufficiently improved.

The rubber composition of the second aspect of the present invention may contain other rubbers in addition to the isoprene-based rubber. Examples of other rubbers include diene rubbers such as butadiene rubber (BR) and styrene butadiene rubber (SBR). BR is preferred.

The BR is not particularly limited, and BR commonly used in the tire industry may be used. Syndiotactic crystal-containing butadiene rubbers (SPB-containing BRs) are preferred because they provide high E* and are excellent in extrusion processability.

In the case where the rubber composition of the second aspect of the present invention contains BR, the amount of BR based on 100% by mass of the rubber component is preferably 10 to 40% by mass, and more preferably 10 to 20% by mass.

The rubber composition of the second aspect of the present invention contains a carbon black having a predetermined nitrogen adsorption specific surface area.

The carbon black has a nitrogen adsorption specific surface area ($N_2SA$) of at least 20 $m^2/g$, preferably at least 60 $m^2/g$, and more preferably at least 65 $m^2/g$. If the $N_2SA$ is less than 20 $m^2/g$, sufficient durability (Hs, elongation at break, and crack growth resistance) may not be secured. The carbon black has an $N_2SA$ of at most 130 $m^2/g$, preferably at most 120 $m^2/g$, and more preferably at most 115 $m^2/g$. If the $N_2SA$ is more than 130 $m^2/g$, the heat build-up due to carbon black may become greater and the reaction with the compound represented by the formula (I) is less likely to progress, leading to insufficient improvement of the fuel economy.

The carbon black preferably has a dibutyl phthalate (DBP) oil absorption of at least 60 $cm^3/100$ g, more preferably at least 70 $cm^3/100$ g. If the DBP oil absorption is less than 60 $cm^3/100$ g, sufficient durability (Hs, elongation at break, and crack growth resistance) may not be secured. The carbon black preferably has a DBP oil absorption of at most 140 $cm^3/100$ g. If the DBP oil absorption is more than 140 $cm^3/100$ g, sufficient fuel economy and elongation at break may not be secured.

The preferred pH and volatile content of the carbon black are the same as defined in the first aspect of the present invention.

The amount of the carbon black per 100 parts by mass of the rubber component is at least 15 parts by mass, preferably at least 50 parts by mass. If the amount is less than 15 parts by mass, sufficient Hs may not be secured. The amount of the carbon black is at most 70 parts by mass, preferably at most 60 parts by mass. If the amount is more than 70 parts by mass, the rubber composition may become so hard that the elongation at break can be reduced, and thus the durability may end up being reduced. In addition, the fuel economy may also be deteriorated.

The rubber composition of the second aspect of the present invention contains the same compound represented by the formula (I) as used in the first aspect of the present invention.

The amount of the compound represented by the formula (I) per 100 parts by mass of the carbon black is at least 0.1 parts by mass, preferably at least 0.5 parts by mass, and more preferably at least 1 part by mass. If the amount is less than 0.1 parts by mass, the fuel economy may not be sufficiently improved. The amount of the compound represented by the formula (I) is at most 20 parts by mass, preferably at most 10 parts by mass, and more preferably at most 5 parts by mass. If the amount is more than 20 parts by mass, sufficient processability may not be secured.

The rubber composition of the second aspect of the present invention contains an organic acid cobalt salt as a cure activator and steel cord adhesion promoter. Examples of the organic acid cobalt salt include cobalt stearate, cobalt boron neodecanoate, cobalt naphthenate, and cobalt neodecanoate. Cobalt stearate is preferred in that it is effective in lowering the viscosity. Cobalt boron neodecanoate is preferred in that it provides favorable elongation at break after oxidative degradation and favorable adhesion to steel cords after hygrothermal degradation.

The amount of the organic acid cobalt salt, calculated as cobalt, per 100 parts by mass of the rubber component is at least 0.05 parts by mass, preferably at least 0.08 parts by mass. If the amount is less than 0.05 parts by mass, sufficient adhesion to steel cords may not be secured. The amount of the organic acid cobalt salt, calculated as cobalt, is at most 0.20 parts by mass, preferably at most 0.17 parts by mass. If the amount is more than 0.20 parts by mass, the elongation at break after oxidative degradation tends to be lowered.

The rubber composition of the second aspect of the present invention preferably contains sulfur. The sulfur is not particularly limited, and sulfur commonly used in the tire industry may be used.

The amount of sulfur per 100 parts by mass of the rubber component is preferably at least 2.5 parts by mass, more preferably at least 3.0 parts by mass, and still more preferably at least 4.5 parts by mass. If the amount is less than 2.5 parts by mass, sufficient adhesion to steel cords may not be secured. In addition, the rubber composition may not be sufficiently cured and thus fail to have the required durability. The amount of sulfur is at most 6.0 parts by mass. If the amount is more than 6.0 parts by mass, curing caused by oxidative degradation may be promoted, lowering the elongation at break and durability.

Here, the amount of sulfur refers to the total net sulfur content derived from soluble sulfur and insoluble sulfur, excluding sulfur derived from sulfur-containing coupling agents such as DURALINK HTS produced by Flexsys. This is because, since the rubber composition for a steel cord topping, strip adjacent to steel cords, or tie gum contains a comparatively large amount of sulfur as a vulcanizing agent, sulfur derived from sulfur-containing coupling agents will not be released in the rubber composition.

The rubber composition of the second aspect of the present invention preferably contains, as a crosslinking agent, at least one of a compound represented by the following formula (II) and its hydrate,

 (II)

wherein q represents an integer of 3 to 10, and X represents lithium, potassium, sodium, magnesium, calcium, barium, zinc, nickel or cobalt. This improves the adhesion to steel cords.

In the formula (II), q is preferably an integer of 3 to 6. X is preferably potassium or sodium. Exemplary hydrates of the compound represented by the formula (II) include sodium salt monohydrates and sodium salt dihydrates. Preferred is sodium hexamethylene-1,6-bisthiosulfate dihydrate.

The amount of the compound represented by the formula (II) and its hydrate per 100 parts by mass of the rubber component is preferably at least 0.1 parts by mass, more preferably at least 0.2 parts by mass, and still more preferably at least 0.5 parts by mass, whereas it is preferably at most 5.0 parts by mass, and more preferably at most 3.0 parts by mass.

The rubber composition of the second aspect of the present invention preferably contains at least one cross-linkable resin selected from the group consisting of resorcinol resins (condensates), modified resorcinol resins (condensates), cresol resins, modified cresol resins, phenolic resins, and modified phenolic resins. This improves the adhesion to steel cords.

Examples of the resorcinol resins include resorcinol-formaldehyde condensates. Examples of the modified resorcinol resins include resorcinol resins whose repeating units are partially alkylated. Examples of the cresol resins include cresol-formaldehyde condensates. Examples of the modified cresol resins include cresol resins whose terminal methyl group is substituted with a hydroxy group, and cresol resins whose repeating units are partially alkylated. Examples of the phenolic resins include phenol-formaldehyde condensates. Examples of the modified phenolic resin include phenolic resins modified with cashew oil, tall oil, linseed oil, various vegetable and animal oils, unsaturated fatty acids, rosin, alkylbenzene resins, aniline, melamine or the like.

The total amount of the cross-linkable resins is preferably 0.5 to 10 parts by mass, and more preferably 1 to 5 parts by mass, per 100 parts by mass of the rubber component.

The rubber composition of the second aspect of the present invention preferably contains, together with the cross-linkable resin (s), at least one methylene donor selected from the group consisting of partial condensates of hexamethoxymethylolmelamine (HMMM) and partial condensates of hexamethylol melamine pentamethyl ether (HMMPME). The amount of the methylene donors is preferably 0.5 to 10 parts by mass, and more preferably 1 to 4 parts by mass, per 100 parts by mass of the rubber component.

The rubber composition of the second aspect of the present invention preferably contains silica. This improves the adhesion to steel cords. The silica is not particularly limited, and silica commonly used in the tire industry may be used.

The silica preferably has a nitrogen adsorption specific surface area ($N_2SA$) of at least 50 $m^2/g$, more preferably at least 80 $m^2/g$. If the $N_2SA$ is less than 50 $m^2/g$, sufficient elongation at break may not be achieved. The silica preferably has an $N_2SA$ of at most 250 $m^2/g$, more preferably at most 200 $m^2/g$. If the $N_2SA$ is more than 250 $m^2/g$, sufficient fuel economy may not be achieved.

The $N_2SA$ of silica is measured by the BET method in conformity with ASTM D3037-93.

The amount of silica is preferably 3 to 55 parts by mass, more preferably 5 to 20 parts by mass, and still more preferably 5 to 15 parts by mass, per 100 parts by mass of the rubber component because favorable adhesion to steel cords and favorable elongation at break are achieved in such cases.

The rubber composition of the second aspect of the present invention preferably contains a C5 petroleum resin as a tackifier processing aid. C5 petroleum resins are prepared by polymerization of C5 (carbon number: 5) petroleum hydrocarbons. The C5 petroleum hydrocarbons refers to C5 fraction (fraction having a carbon number of 5) obtained by pyrolysis of naphtha. Specific examples thereof include diolefins such as isoprene, 1,3-pentadiene, dicyclopentadiene, and piperylene, and monoolefins such as 2-methyl-1-butene, 2-methyl-2-butene, and cyclopentene. The amount of the C5 petroleum resin is preferably 0 to 5 parts by mass, and more preferably 0 to 2 parts by mass, per 100 parts by mass of the rubber component.

The rubber composition of the second aspect of the present invention may appropriately contain, in addition to the above components, compounding agents commonly used in production of rubber compositions, such as reinforcing fillers (e.g., silica), silane coupling agents, antioxidants, oils, waxes, and vulcanization accelerators.

The amount of oil per 100 parts by mass of the rubber component is preferably at most 3 parts by mass, more preferably at most 2 parts by mass, and still more preferably at most 1 part by mass, and may be 0 parts by mass. If the amount is more than 3 parts by mass, the adhesion to steel cords may be lowered, and the reaction between the compound represented by the formula (I) and the functional group on the carbon black surface may be inhibited.

The vulcanization accelerator is not particularly limited, and those commonly used in the tire industry, such as N,N-dicyclohexyl-2-benzothiazolylsulfenamide (DCBS), may be used. In terms of low environmental load, preferred are N-tert-butyl-2-benzothiazolylsulfenimide (TBSI), N,N-di(2-ethylhexyl)-2-benzothiazolylsulfenamide (BEHZ), N,N-di (2-methylhexyl)-2-benzothiazolylsulfenamide (BMHZ), and N-ethyl-N-t-butylbenzothiazole-2-sulfenamide (ETZ). More preferred is TBSI. The amount of the vulcanization accelerator is preferably 0.1 to 5 parts by mass, and more preferably 0.5 to 2 parts by mass, per 100 parts by mass of the rubber component.

The rubber composition of the second aspect of the present invention may be prepared by any known method, for example, by kneading the components with a known mixer such as a roll mill or Banbury mixer.

The rubber composition of the second aspect of the present invention can be used for steel cord toppings, strips adjacent to steel cords, and tie gums of tires. In particular, it can be suitably used for steel cord topping rubbers (especially breaker topping rubbers) having a natural rubber content of 100% by mass for the purpose of securing the maximum elongation at break.

A strip adjacent to steel cords is a component referred to as, for example, a breaker edge strip, strip between a breaker and a ply, or a strip on a breaker cushion (strip under a first breaker), and is specifically shown in FIGS. 1 to 3 mentioned later.

A tie gum is a component positioned between carcass cords and an inner liner, and is specifically shown in FIG. 1 of JP-A 2010-095705 (which is incorporated by reference in the entirety) and the like.

The strip adjacent to steel cords is described in the following with reference to FIGS. 1 to 3. Each of FIGS. 1 to 3 is an exemplary partial cross sectional view of a pneumatic tire. FIG. 1 shows a case where a breaker edge strip 16 is provided between an inner layer 44 and an outer layer 46 of a breaker 12, in the vicinity of the end portion of the breaker 12, and a breaker cushion 32 is provided next to a strip layer between a breaker and a ply (BP strip layer) 30, between a carcass ply 28 and a strip on a breaker cushion (strip under a first breaker) 31. FIG. 2 shows a case where in the vicinity of the edge portion of a breaker 12, a breaker edge strip 16A is provided to cover the edge portion of an outer layer 46 of the breaker 12, and a breaker edge strip 16B is provided to cover the edge portion of an inner layer 44 of the breaker 12; and a breaker cushion 32 is provided next to a strip layer between a breaker and a ply (BP strip layer) 30, between a carcass ply 28 and the inner layer 44 of the breaker 12 or the breaker edge strip 16B. FIG. 3 shows a case where in the vicinity of the end portion of a breaker 12, a breaker edge strip 16A is provided between an outer layer 46 of the breaker 12 and a band 15, and a breaker edge strip 16B is provided between an inner layer 44 and the outer layer 46 of the breaker 12; and a breaker cushion 32 is provided next to a strip layer between a breaker and a ply (BP strip layer) 30, between a carcass ply 28 and a strip on a breaker cushion (strip under a first breaker) 31.

FIGS. 1 to 3 each show a case where a strip layer between a breaker and a ply (BP strip layer) 30 is provided as a strip adjacent to steel cords, between an inner layer 44 of a breaker 12 and a carcass ply 28. Also, FIGS. 1 and 3 each show a case where a strip on a breaker cushion (strip under a first breaker) 31 is provided as a strip adjacent to steel cords, between an inner layer 44 of a breaker 12 and a breaker cushion 32.

The pneumatic tire of the second aspect of the present invention can be produced from the rubber composition by an ordinary method. Specifically, an unvulcanized rubber composition appropriately containing various additives is extruded into the shape of a component for topping steel cords of, for example, a carcass (case) or into the shape of a tie gum, and then arranged in an ordinary manner and assembled with other tire components in a tire building machine to prepare an unvulcanized tire. The unvulcanized tire is pressurized under heat in a vulcanizer to form a pneumatic tire of the present invention.

The pneumatic tire of the second aspect of the present invention can be used as a tire for passenger vehicles, a heavy-duty tire and the like.

(Third Aspect of the Present Invention)

The rubber composition of the third aspect of the present invention contains a specific rubber component, a specific carbon black, and a compound represented by the formula (I). The compound represented by the formula (I) binds to carbon black by a reaction of its terminal nitrogen functional group with a functional group, such as a carboxyl group, present on the surface of carbon black. Also, its carbon-carbon double bond site binds to polymers by a reaction with polymer radicals or a reaction involving sulfur crosslinking. Therefore, the dispersibility of carbon black can be improved and the favorable dispersion state can be maintained during service. In addition, the polymers restrict the carbon black via the compound represented by the formula (I), and therefore heat build-up can be suppressed. The addition of the compound represented by the formula (I), which provides these effects, together with a specific carbon black to a rubber composition containing a specific rubber component improves the fuel economy of the rubber composition and provides favorable weather resistance and flex crack growth resistance.

The rubber composition of the third aspect of the present invention contains a diene rubber as the rubber component. Examples of the diene rubber include natural rubber (NR), isoprene rubber (IR), butadiene rubber (BR), styrene butadiene rubber (SBR), styrene isoprene butadiene rubber (SIBR), chloroprene rubber (CR), and acrylonitrile butadiene rubber (NBR). Preferred are NR, IR, and BR. More preferred are NR and BR. NR has a large molecular weight, and has its polymer chains cleaved during kneading to generate radicals. The compound represented by the formula (I) captures these generated radicals, so that the polymer chains and the compound represented by the formula (I) are efficiently bound to each other. In addition, the use of BR provides favorable flex crack growth resistance.

The NR is not particularly limited and NR commonly used in the tire industry, such as SIR20, RSS #3, or TSR20, may be used.

Also, the BR is not particularly limited, and may suitably be BR (high-cis BR) having a high cis content (e.g., BR130B, BR150B produced by UBE INDUSTRIES, LTD.), modified BR, or the like.

The amount of NR based on 100% by mass of the rubber component is preferably at least 20% by mass, and more preferably at least 25% by mass. If the amount is less than 20% by mass, the fuel economy may not be sufficiently improved. The amount is preferably at most 50% by mass, and more preferably at most 45% by mass. If the amount is more than 50% by mass, the flex crack growth resistance may be lowered.

The amount of BR based on 100% by mass of the rubber component is preferably at least 20% by mass, and more preferably at least 25% by mass. If the amount is less than 20% by mass, the flex crack growth resistance may be lowered. The amount is preferably at most 50% by mass, and more preferably at most 45% by mass. If the amount is more than 50% by mass, the fuel economy may be deteriorated.

The amount (total amount) of the diene rubber based on 100% by mass of the rubber component is at least 60% by mass, preferably at least 65% by mass. If the amount is less than 60% by mass, the fuel economy may not be sufficiently improved. The amount is at most 75% by mass, preferably at most 72% by mass. If the amount is more than 75% by mass, the amount of the low unsaturation copolymer becomes small, possibly failing to secure sufficient weather resistance.

The rubber composition of the third embodiment of the present invention contains, in addition to the diene rubber, a low unsaturation copolymer as the rubber component. Since low unsaturation copolymers do not have a large amount of double bonds in a molecule, the addition of a low unsaturation copolymer provides favorable weather resistance.

Examples of the low unsaturation copolymer include ethylene-propylene rubber (EPM) and ethylene-propylene-diene rubber (EPDM). Also usable are brominated copolymers of isobutylene and p-methylstyrene. Preferred are EPDM and brominated copolymers of isobutylene and p-methylstyrene, and more preferred are combinations thereof.

The degree of unsaturation of EPDM is determined by the iodine value. The EPDM preferably has an iodine value of at most 350, more preferably at most 100, and still more preferably at most 30. The degree of unsaturation of brominated copolymers of isobutylene and p-methylstyrene is determined by $^1$H-NMR. The brominated copolymer of isobutylene and p-methylstyrene preferably has a degree of unsaturation of 0.6 to 2.5 mol %.

EPDM is formed by introducing a small amount of a third diene component into EPM which is a copolymer of ethylene and propylene. Examples of the third diene component include C5-C20 unconjugated dienes. Examples of the unconjugated dienes include: linear dienes such as 1,4-pentadiene, 1,4-hexadiene, 1,5-hexadiene, 2,5-dimethyl-1,5-hexadiene, and 1,4-octadiene; cyclic dienes such as 1,4-cyclohexadiene, cyclooctadiene, and dicyclopentadiene; and alkenylnorbornenes such as 5-ethylidene-2-norbornene, 5-butylidene-2-norbornene, 2-metallyl-5-norbornene, and 2-isopropenyl-5-norbornene. In particular, alkenylnorbornenes are preferred, and 5-ethylidene-2-norbornene is more preferred. The amount of the third diene component is preferably 6 to 12% by mass.

Brominated copolymers of isobutylene and p-methylstyrene have no double bond in a molecule and therefore are excellent in weather resistance, just like butyl rubber. In addition, the brominated copolymers contain a styrene unit and therefore advantageously have higher compatibility with diene rubbers than butyl rubber. The brominated copolymers preferably have a mass ratio of isobutylene unit to p-methylstyrene unit of 90/10 to 98/2 and a bromine content of 0.5 to 5% by mass because such brominated copolymers are excellent in cocurability. Examples of commercial products of the brominated copolymers include EXXPRO 90-10 produced by Exxon Mobil Corporation.

The amount of EPDM based on 100% by mass of the rubber component is preferably at least 5% by mass, and more preferably at least 10% by mass. If the amount is less than 5% by mass, the weather resistance may not be improved. The amount is preferably at most 30% by mass, and more preferably at most 25% by mass. If the amount is more than 30% by mass, the fuel economy may be deteriorated.

The amount of the brominated copolymer of isobutylene and p-methylstyrene based on 100% by mass of the rubber component is preferably at least 5% by mass, and more preferably at least 10% by mass. If the amount is less than 5% by mass, the weather resistance may be insufficient. The amount is preferably at most 30% by mass, and more preferably at most 25% by mass. If the amount is more than 30% by mass, the rubber composition may have poor adhesion to other rubber layers, resulting in poor durability.

The amount (total amount) of the low unsaturation copolymer based on 100% by mass of the rubber component is at least 25% by mass, preferably at least 27% by mass, and more preferably at least 30% by mass. If the amount is less than 25% by mass, sufficient weather resistance may not be achieved. The amount is at most 40% by mass, preferably at most 38% by mass, and more preferably at most 35% by mass. If the amount is more than 40% by mass, the amount of the diene rubber becomes small, possibly failing to achieve sufficient fuel economy.

The rubber composition of the third aspect of the present invention contains a carbon black having a predetermined nitrogen adsorption specific surface area.

The carbon black has a nitrogen adsorption specific surface area ($N_2SA$) of at least 30 m$^2$/g, preferably at least 35 m$^2$/g, and more preferably at least 40 m$^2$/g. If the $N_2SA$ is less than 30 m$^2$/g, sufficient flex crack growth resistance may not be secured. The $N_2SA$ is at most 120 m$^2$/g, preferably at most 100 m$^2$/g, and more preferably at most 80 m$^2$/g. If the $N_2SA$ is more than 120 m$^2$/g, the fuel economy may not be sufficiently improved.

The carbon black preferably has a dibutyl phthalate (DBP) oil absorption of at least 40 cm$^3$/100 g, more preferably at least 70 cm$^3$/100 g. If the DBP oil absorption is less than 40 cm$^3$/100 g, sufficient flex crack growth resistance may not be secured. The DBP oil absorption is preferably at most 180 cm$^3$/100 g, and more preferably at most 160 cm$^3$/100 g. If the DBP oil absorption is more than 180 cm$^3$/100 g, the minimum elongation at break required may not be secured.

The preferred pH and volatile content of the carbon black are the same as defined in the first aspect of the present invention.

The amount of the carbon black per 100 parts by mass of the rubber component is at least 20 parts by mass, preferably at least 30 parts by mass. If the amount is less than 20 parts by mass, sufficient flex crack growth resistance may not be secured. The amount is at most 60 parts by mass, preferably at most 55 parts by mass. If the amount is more than 60 parts by mass, the rubber composition may become so hard that the flex crack growth resistance can end up being reduced. In addition, the fuel economy may be deteriorated.

The rubber composition of the third aspect of the present invention contains the same compound represented by the formula (I) as used in the first aspect of the present invention.

The amount of the compound represented by the formula (I) per 100 parts by mass of the carbon black is at least 0.5 parts by mass, preferably at least 1 part by mass, and more preferably at least 2 parts by mass. If the amount is less than 0.5 parts by mass, the fuel economy may not be sufficiently improved. The amount of the compound represented by the formula (I) is at most 20 parts by mass, preferably at most 15 parts by mass, and more preferably at most 10 parts by mass. If the amount is more than 20 parts by mass, sufficient flex crack growth resistance may not be secured.

The rubber composition of the third aspect of the present invention may appropriately contain, in addition to the above components, compounding agents commonly used in production of rubber compositions, such as reinforcing fillers (e.g., silica), zinc oxide, stearic acid, silane coupling agents, antioxidants, oils, waxes, sulfur, and vulcanization accelerators.

Examples of the vulcanization accelerators include sulfenamide, thiazole, thiuram, thiourea, guanidine, dithiocarbamate, aldehyde-amine, aldehyde-ammonium, imidazoline, and xanthate vulcanization accelerators. In particular, sulfenamide vulcanization accelerators are preferred. Examples of the sulfenamide vulcanization accelerators include N-tert-butyl-2-benzothiazolylsulfenamide (TBBS), N-cyclohexyl-2-benzothiazolylsulfenamide (CBS), and N,N'-dicyclohexyl-2-benzothiazolylsulfenamide (DZ).

The rubber composition of the third aspect of the present invention can be prepared by any known method, for example, by kneading the components with a known mixer such as a roll mill or Banbury mixer.

The rubber composition of the third aspect of the present invention can be used for sidewalls of tires.

The pneumatic tire of the third aspect of the present invention can be produced from the rubber composition by a conventional method. Specifically, an unvulcanized rubber composition appropriately containing various additives is extruded into the shape of a sidewall, and then arranged in an ordinary manner and assembled with other tire components in a tire building machine to prepare an unvulcanized tire. The unvulcanized tire is pressurized under heat in a vulcanizer to form a pneumatic tire of the present invention.

The pneumatic tire of the third aspect of the present invention can be suitably used as a tire for passenger vehicles.

EXAMPLES

The present invention is more specifically described with reference to, but not limited to, examples.
(Examples Corresponding to the First Aspect of the Present Invention)
In the following, agents used in examples and comparative examples shown in Tables 1 and 2 are listed.
NR: TSR20
IR: IR2200
BR 1: BUNA-CB25 (rare-earth BR synthesized in the presence of a Nd catalyst, vinyl content: 0.7% by mass, cis content: 97% by mass) produced by LANXESS
BR 2: BUNA-CB22 (rare-earth BR synthesized in the presence of a Nd catalyst, vinyl content: 0.6% by mass, cis content: 97% by mass) produced by LANXESS BR 3: BR150B (BR synthesized in the presence of a Co catalyst, cis content: 98% by mass) produced by UBE INDUSTRIES, LTD.

BR 4: VCR617 (SPB-containing BR, SPB content: 17% by mass) produced by UBE INDUSTRIES, LTD.

BR 5: BR1250H (tin-modified BR) produced by ZEON CORPORATION

Compound I: (2Z)-4-[(4-aminophenyl)amino]-4-oxo-2-butenoic acid sodium salt (compound represented by the following formula) produced by Sumitomo Chemical Co., Ltd.

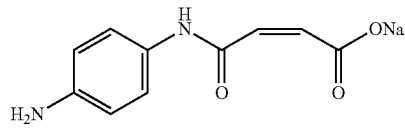

S-(3-aminopropyl)thiosulfuric acid:
S-(3-aminopropyl)thiosulfuric acid (compound represented by the following formula) produced by Sumitomo Chemical Co., Ltd.

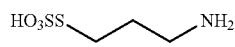

Carbon black 1: Statex N550 ($N_2$SA: 40 m$^2$/g, DBP oil absorption: 115 cm$^3$/100 g, pH: 6.8, volatile content: 1.8% by mass) produced by Columbian Chemicals Carbon black 2: Statex N660 ($N_2$SA: 34 m$^2$/g, DBP oil absorption: 82 cm$^3$/100 g, pH: 7.7, volatile content: 1.7% by mass) produced by Columbian Chemicals Carbon black 3: Statex N330 ($N_2$SA: 78 m$^2$/g, DBP oil absorption: 102 cm$^3$/100 g, pH: 7.4, volatile content: 1.8% by mass) produced by Columbian Chemicals Carbon black 4: Statex N762 ($N_2$SA: 29 m$^2$/g, DBP oil absorption: 68 cm$^3$/100 g, pH: 6.9, volatile content: 1.0% by mass) produced by Columbian Chemicals Carbon black 5: Statex N220 ($N_2$SA: 114 m$^2$/g, DBP oil absorption: 114 cm$^3$/100 g, pH: 7.5, volatile content: 1.8% by mass) produced by Columbian Chemicals Silica: U9000Gr produced by EVONIK DEGUSSA Silane coupling agent: Si75 produced by EVONIK DEGUSSA C5 petroleum resin: Marukarez T-100AS (softening point: 102° C.) produced by Maruzen Petrochemical TDAE oil: Vivatec produced by H&R Wax: Ozoace 355 produced by NIPPON SEIRO CO., LTD.

Antioxidant 6PPD: Antigene 6C produced by Sumitomo Chemical Co., Ltd.

Antioxidant TMQ: NOCRAC 224 produced by OUCHI SHINKO CHEMICAL INDUSTRIAL CO., LTD.

Stearic acid: Stearic acid "TSUBAKI" produced by NOF CORPORATION

Zinc oxide: Ginrei R produced by TOHO ZINC CO., LTD.

5% oil-containing powder sulfur: HK-200-5 produced by Hosoi Chemical Industry Co., Ltd.

Vulcanization accelerator TBBS: NOCCELER NS-G produced by OUCHI SHINKO CHEMICAL INDUSTRIAL CO., LTD.

HTS: DURALINK HTS (sodium hexamethylene-1,6-bisthiosulfate dihydrate) produced by Flexsys Examples and Comparative Examples Base Kneading A 1.7-L Banbury mixer (KOBE STEEL, LTD.) was charged with a rubber component, Compound I, and about 30 parts by mass of carbon black, and then charged with materials except sulfur, vulcanization accelerators, and HTS. The mixture was kneaded for four minutes and discharged at 150° C. to give a kneaded mass.

Final Kneading

To the kneaded mass were added the sulfur, vulcanization accelerators, and HTS. The mixture was kneaded with an open roll mill for two minutes and discharged at 105° C. to give an unvulcanized rubber composition.

(Vulcanization)

The obtained unvulcanized rubber composition was press-vulcanized at 150° C. for 30 minutes to give a vulcanized rubber composition.

The following evaluations were performed on the obtained unvulcanized rubber compositions and vulcanized rubber compositions. Tables 1 and 2 show the results.

(Viscoelasticity Test)

The complex modulus of elasticity E*(MPa) and loss tangent tan δ of each vulcanized rubber composition were measured using a viscoelastic spectrometer VES (Iwamoto Seisakusho) at a temperature of 70° C., a frequency of 10 Hz, an initial strain of 10%, and a dynamic strain of 2%. A larger E* indicates higher rigidity and better handling stability. A smaller tan δ indicates less heat build-up and better fuel economy. The values of tan δ are also expressed as indices relative to that of Comparative Example 1 (=100). A larger index indicates better fuel economy.

(Tensile Test)

A No. 3 dumbbell specimen prepared from each vulcanized rubber composition was subjected to a tensile test at room temperature in conformity with JIS K 6251 "Rubber, vulcanized or thermoplastic—Determination of tensile stress-strain properties", and the elongation at break (EB) (%) (of the fresh sample) was measured. Each vulcanized rubber composition was placed in an oven in an air atmosphere and subjected to oxidative degradation at 80° C. for 168 hours. Then, the elongation at break (EB) (%) (after oxidative degradation) was measured in the same manner. A larger EB indicates better elongation at break (durability). The values of EB are also expressed as indices relative to that of Comparative Example 1 (=100). A larger index indicates better elongation at break (durability).

(Processability)

Each unvulcanized rubber composition was extruded and then formed into the shape of a predetermined sidewall packing. The resulting product was assembled with bead wires to prepare a sample, which was then evaluated visually and tactually for edge conditions, compound scorch, adhesion between rubber products, and flatness. The evaluation results of each example are expressed as an index relative to that of Comparative Example 1 (=100). A larger index indicates better processability.

In terms of the edge conditions, straightest and smoothest edges were evaluated as favorable. In terms of the compound scorch, the absence of irregularities due to cured bits on a 15-cm-square and 2-mm-thick sheet cut out of the sample was evaluated as favorable. In terms of the flatness, the sheet that was flat enough to adhere tightly to a flat plate was evaluated as favorable.

TABLE 1

| Rubber composition for sidewall packing | | | Example 1 | 2 | 3 | 4 | 5 | 6 | 7 | 8 | 9 | 10 | 11 |
|---|---|---|---|---|---|---|---|---|---|---|---|---|---|
| Formulation (part(s) by mass) | NR | | 100 | 100 | 100 | 80 | 50 | 100 | 80 | 80 | 100 | 100 | 100 |
| | IR | | — | — | — | 20 | 50 | — | 20 | 20 | — | — | — |
| | BR 1 (CB25) | | — | — | — | — | — | — | — | — | — | — | — |
| | BR 2 (CB22) | | — | — | — | — | — | — | — | — | — | — | — |
| | BR 3 (BR150B) | | | | | | | | | | | | |
| | BR 4 (VCR617) | | — | — | — | — | — | — | — | — | — | — | — |
| | BR 5 (BR1250H) | | | | | | | | | | | | |
| | Compound I | | 1 | 2 | 3 | 4 | 8 | 1 | 1 | 1 | 1 | 1 | 1 |
| | S-(3-aminopropyl) thiosulfuric acid | | — | — | — | — | — | — | — | — | — | — | — |
| | Carbon black 1 (N550) | | 45 | 45 | 45 | 45 | 45 | 10 | — | 15 | — | 45 | 45 |
| | Carbon black 2 (N660) | | — | — | — | — | — | — | — | — | — | — | — |
| | Carbon black 3 (N330) | | — | — | — | — | — | — | 25 | — | — | — | — |
| | Carbon black 4 (N762) | | — | — | — | — | — | 45 | — | — | 45 | — | — |
| | Carbon black 5 (N220) | | — | — | — | — | — | — | — | 20 | — | — | — |
| | Silica | | — | — | — | — | — | — | 12 | — | 10 | — | — |
| | Silane coupling agent | | — | — | — | — | — | — | 1.2 | — | — | — | — |
| | C5 petroleum resin | | 2 | 2 | 2 | 2 | 2 | 2 | 2 | 2 | 2 | 2 | 2 |
| | TDAE oil | | 2 | 2 | 2 | 2 | 2 | 2 | 2 | 2 | 2 | 2 | 2 |
| | Wax | | — | — | — | — | — | — | — | — | — | — | — |
| | Antioxidant 6PPD | | 1 | 1 | 1 | 1 | 1 | 1 | 1 | 1 | 1 | 1 | 1 |
| | Antioxidant TMQ | | 1 | 1 | 1 | 1 | 1 | 1 | 1 | 1 | 1 | 1 | 1 |
| | Stearic acid | | 2 | 2 | 2 | 2 | 2 | 2 | 2 | 2 | 2 | 2 | 2 |
| | Zinc oxide | | 4 | 4 | 4 | 4 | 10 | 4 | 4 | 4 | 4 | 4 | 4 |
| | 5% oil-containing powder sulfur | | 2.8 | 2.8 | 2.8 | 2.8 | 2.8 | 2.8 | 2.8 | 2.8 | 2.8 | 2.1 | 1.8 |
| | Net sulfur content | | 2.7 | 2.7 | 2.7 | 2.7 | 2.7 | 2.7 | 2.7 | 2.7 | 2.7 | 2.0 | 1.7 |
| | Vulcanization accelerator TBBS | | 0.7 | 0.7 | 0.7 | 0.7 | 0.7 | 0.7 | 0.7 | 0.7 | 0.7 | 1 | 1.2 |
| | HTS | | — | — | — | — | — | — | — | — | — | — | 1.5 |
| | Net sulfur content | | | | | | | | | | | | 0.5 |
| [(Amount of Compound I)/ (amount of carbon black)] × 100 | | | 2.22 | 4.44 | 6.67 | 8.89 | 17.78 | 1.82 | 4.00 | 2.86 | 2.22 | 2.22 | 2.22 |
| Evaluation | E* | target: 3.5-4.5 | 3.85 | 3.87 | 3.92 | 3.96 | 4.11 | 3.75 | 3.65 | 3.75 | 3.84 | 3.91 | 3.85 |
| | tan δ | target: ≤0.100 | 0.042 | 0.039 | 0.035 | 0.033 | 0.032 | 0.036 | 0.049 | 0.050 | 0.039 | 0.046 | 0.042 |
| | EB % (fresh sample) | primary target: >450, secondary target: >480 | 515 | 515 | 510 | 505 | 485 | 460 | 545 | 585 | 475 | 495 | 515 |
| | EB % (after oxidative degradation) | primary target: >340, secondary target: >350 | 400 | 400 | 410 | 405 | 400 | 350 | 435 | 415 | 350 | 400 | 415 |
| | (1) tan δ index | primary target: ≥104, secondary target: ≥110 | 124 | 133 | 149 | 158 | 163 | 144 | 106 | 104 | 133 | 113 | 124 |
| | (2) EB index (fresh sample) | target: ≥90 | 101 | 101 | 100 | 99 | 95 | 90 | 107 | 115 | 93 | 97 | 101 |
| | (3) EB index (after oxidative degradation) | target: ≥90 | 105 | 105 | 108 | 107 | 105 | 92 | 114 | 109 | 92 | 105 | 109 |
| | Average of three indices (1)-(3) | primary target: >104, secondary target: >105 | 110 | 113 | 119 | 121 | 121 | 109 | 109 | 109 | 106 | 105 | 111 |

TABLE 1-continued

| Process-ability index | target: ≥90 | 97 | 94 | 92 | 90 | 90 | 100 | 90 | 92 | 105 | 97 | 97 |

| | | Example | | | | | | | | |
|---|---|---|---|---|---|---|---|---|---|---|
| Rubber composition for sidewall packing | | 12 | 13 | 14 | 15 | 16 | 17 | 18 | 19 | 20 |
| Formulation (part(s) by mass) | NR | 100 | 60 | 90 | 100 | 100 | 62 | 80 | 100 | 80 |
| | IR | — | — | — | — | — | — | 20 | — | 20 |
| | BR 1 (CB25) | — | 40 | 10 | — | — | — | — | — | — |
| | BR 2 (CB22) | — | — | — | — | — | — | — | — | — |
| | BR 3 (BR150B) | — | — | — | — | — | — | — | — | — |
| | BR 4 (VCR617) | — | — | — | — | — | 18 | — | — | — |
| | BR 5 (BR1250H) | — | — | — | — | — | 20 | — | — | — |
| | Compound I | 1 | 1 | 1 | 1 | 1 | 1 | 1 | 4 | 1 |
| | S-(3-aminopropyl)thiosulfuric acid | — | — | — | — | — | — | — | — | — |
| | Carbon black 1 (N550) | 45 | 45 | 45 | 45 | 45 | — | 45 | 45 | 45 |
| | Carbon black 2 (N660) | — | — | — | — | — | — | — | — | — |
| | Carbon black 3 (N330) | — | — | — | — | — | 27 | — | — | — |
| | Carbon black 4 (N762) | — | — | — | — | — | — | — | — | — |
| | Carbon black 5 (N220) | — | — | — | — | — | — | — | — | — |
| | Silica | — | — | 10 | — | — | 15 | — | — | — |
| | Silane coupling agent | — | — | 1 | — | — | 2 | — | — | — |
| | C5 petroleum resin | 2 | 2 | 2 | 2 | 2 | 2 | 2 | — | — |
| | TDAE oil | 2 | 2 | 2 | 2 | 2 | 2 | — | 8 | — |
| | Wax | — | — | — | — | — | — | — | — | — |
| | Antioxidant 6PPD | 1 | 1 | 1 | 1 | 1 | 1 | 1 | 1 | 1 |
| | Antioxidant TMQ | 1 | 1 | 1 | 1 | 1 | 1 | 1 | 1 | 1 |
| | Stearic acid | 2 | 2 | 2 | 2 | 2 | 2 | 2 | 2 | 2 |
| | Zinc oxide | 4 | 4 | 4 | 2.5 | 10 | 4 | 4 | 4 | 4 |
| | 5% oil-containing powder sulfur | 3.15 | 2.8 | 2.8 | 2.8 | 2.8 | 2.8 | 2.8 | 2.8 | 2.8 |
| | Net sulfur content | 3.0 | 2.7 | 2.7 | 2.7 | 2.7 | 2.7 | 2.7 | 2.7 | 2.7 |
| | Vulcanization accelerator TBBS | 0.5 | 0.7 | 0.7 | 0.7 | 0.7 | 0.7 | 0.7 | 0.8 | 0.7 |
| | HTS | — | — | — | — | — | — | — | — | — |
| | Net sulfur content | | | | | | | | | |
| [(Amount of Compound I)/(amount of carbon black)] × 100 | | 2.22 | 2.22 | 2.22 | 2.22 | 2.22 | 3.70 | 3.70 | 3.70 | 3.70 |
| Evaluation | E* | target: 3.5-4.5 | 3.77 | 4.25 | 3.89 | 3.65 | 3.85 | 4.05 | 3.98 | 3.91 | 3.90 |
| | tan δ | target: ≤0.100 | 0.041 | 0.037 | 0.040 | 0.045 | 0.040 | 0.037 | 0.039 | 0.042 | 0.038 |
| | EB % (fresh sample) | primary target: >450, secondary target: >480 | 545 | 485 | 525 | 515 | 525 | 485 | 525 | 485 | 520 |
| | EB % (after oxidative degradation) | primary target: >340, secondary target: >350 | 350 | 350 | 415 | 385 | 435 | 390 | 415 | 375 | 415 |
| | (1) tan δ index | primary target: ≥104, secondary target: ≥110 | 127 | 141 | 130 | 116 | 130 | 141 | 133 | 124 | 137 |
| | (2) EB index (fresh sample) | target: ≥90 | 107 | 95 | 103 | 101 | 103 | 95 | 103 | 95 | 102 |
| | (3) EB index (after oxidative degradation) | target: ≥90 | 92 | 92 | 109 | 101 | 114 | 103 | 109 | 99 | 109 |

TABLE 1-continued

|  |  |  |  |  |  |  |  |  |  |  |
|---|---|---|---|---|---|---|---|---|---|---|
| Average of three indices (1)-(3) | primary target: >104, secondary target: >105 | 109 | 109 | 114 | 106 | 116 | 113 | 115 | 106 | 116 |
| Processability index | target: ≥90 | 97 | 90 | 105 | 92 | 115 | 110 | 90 | 110 | 90 |

TABLE 2

| | Rubber composition for sidewall packing | | Comparative Example | | | | | | | | |
|---|---|---|---|---|---|---|---|---|---|---|---|
| | | | 1 | 2 | 3 | 4 | 5 | 6 | 7 | 8 | 9 |
| Formulation (part(s) by mass) | NR | | 100 | 100 | 50 | 100 | 100 | 100 | 30 | 100 | 100 |
| | IR | | — | — | 50 | — | — | — | 20 | — | — |
| | BR 1 (CB25) | | — | — | — | — | — | — | 50 | — | — |
| | BR 2 (CB22) | | — | — | — | — | — | — | — | — | — |
| | BR 3 (BR150B) | | — | — | — | — | — | — | — | — | — |
| | BR 4 (VCR617) | | — | — | — | — | — | — | — | — | — |
| | BR 5 (BR1250H) | | — | — | — | — | — | — | — | — | — |
| | Compound I | | — | 0.04 | 10 | 1 | 2 | 1 | 1 | 1 | — |
| | S-(3-aminopropyl) thiosulfuric acid | | — | — | — | — | — | — | — | — | 1 |
| | Carbon black 1 (N550) | | 45 | 45 | 45 | 10 | — | 45 | 45 | 45 | 45 |
| | Carbon black 2 (N660) | | — | — | — | — | 60 | — | — | — | — |
| | Carbon black 3 (N330) | | — | — | — | — | — | — | — | — | — |
| | Carbon black 4 (N762) | | — | — | — | — | — | — | — | — | — |
| | Carbon black 5 (N220) | | — | — | — | 30 | — | — | — | — | — |
| | Silica | | — | — | — | — | — | — | — | — | 10 |
| | Silane coupling agent | | — | — | — | — | — | — | — | — | — |
| | C5 petroleum resin | | 2 | 2 | 2 | 2 | 2 | 2 | 2 | 2 | 2 |
| | TDAE oil | | 2 | 2 | 2 | 2 | 8 | 2 | 2 | 2 | 2 |
| | Wax | | — | — | — | — | 1.5 | — | — | — | — |
| | Antioxidant 6PPD | | 1 | 1 | 1 | 1 | 3 | 1 | 1 | 1 | 1 |
| | Antioxidant TMQ | | 1 | 1 | 1 | 1 | 1 | 1 | 1 | 1 | 1 |
| | Stearic acid | | 2 | 2 | 2 | 2 | 2 | 2 | 2 | 2 | 2 |
| | Zinc oxide | | 4 | 4 | 10 | 4 | 4 | 4 | 4 | 4 | 4 |
| | 5% oil-containing powder sulfur | | 2.8 | 2.8 | 2.8 | 2.8 | 2.8 | 3.26 | 2.8 | 1.5 | 2.8 |
| | Net sulfur content | | 2.7 | 2.7 | 2.7 | 2.7 | 2.7 | 3.1 | 2.7 | 1.4 | 2.7 |
| | Vulcanization accelerator TBBS | | 0.7 | 0.7 | 0.7 | 0.7 | 0.7 | 0.55 | 0.7 | 1.7 | 0.7 |
| | HTS | | — | — | — | — | — | — | — | 1.0 | — |
| | Net sulfur content | | | | | | | | | 0.3 | |
| | [(Amount of Compound I)/(amount of carbon black)] × 100 | | — | 0.09 | 22.22 | 2.50 | 3.33 | 2.22 | 2.22 | 2.22 | — |
| Evaluation | E* | target: 3.5-4.5 | 3.85 | 3.86 | 4.53 | 3.75 | 4.05 | 3.75 | 4.55 | 3.95 | 3.95 |
| | tan δ | target: ≤0.100 | 0.052 | 0.051 | 0.034 | 0.049 | 0.051 | 0.042 | 0.036 | 0.041 | 0.042 |
| | EB % (fresh sample) | primary target: >450, secondary target: >480 | 510 | 515 | 435 | 555 | 440 | 540 | 465 | 455 | 430 |
| | EB % (after oxidative degradation) | primary target: >340, secondary target: >350 | 380 | 380 | 335 | 370 | 320 | 300 | 320 | 340 | 315 |
| | (1) tan δ index | primary target: ≥104, secondary target: ≥110 | 100 | 102 | 153 | 106 | 102 | 124 | 144 | 127 | 124 |
| | (2) EB index (fresh sample) | target: ≥90 | 100 | 101 | 85 | 109 | 86 | 106 | 91 | 89 | 84 |
| | (3) EB index (after oxidative degradation) | target: ≥90 | 100 | 100 | 88 | 97 | 84 | 79 | 84 | 89 | 83 |
| | Average of three indices of (1)-(3) | primary target: >104, secondary target: >105 | 100 | 101 | 109 | 104 | 91 | 103 | 107 | 102 | 97 |
| | Processability index | target: ≥90 | 100 | 97 | 70 | 90 | 80 | 97 | 70 | 97 | 80 |

Tables 1 and 2 show that, in the examples using predetermined amounts of an isoprene-based rubber, a specific carbon black, sulfur, and a compound represented by the formula (I), the fuel economy, durability, and processability were improved in a balanced manner. The handling stability was also favorable.

Examples Corresponding to the Second Aspect of the Present Invention

In the following, agents used in examples and comparative examples shown in Tables 3 and 4 are listed.
NR: TSR20
IR: IR2200
BR: VCR617 (SPB-containing BR, SPB content: 17% by mass) produced by UBE INDUSTRIES, LTD.
Compound I: (2Z)-4-[(4-aminophenyl)amino]-4-oxo-2-butenoic acid sodium salt (compound represented by the following formula) produced by Sumitomo Chemical Co., Ltd.

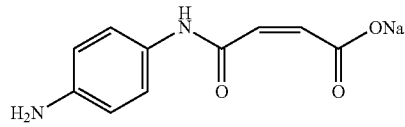

S-(3-aminopropyl)thiosulfuric acid:
S-(3-aminopropyl)thiosulfuric acid (compound represented by the following formula) produced by Sumitomo Chemical Co., Ltd.

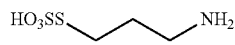

Carbon black 1: Statex N550 ($N_2SA$: 40 $m^2/g$, DBP oil absorption: 115 $cm^3/100\,g$, pH: 6.8, volatile content: 1.8% by mass) produced by Columbian Chemicals
Carbon black 2: Statex N219 ($N_2SA$: 110 $m^2/g$, DBP oil absorption: 78 $cm^3/100\,g$, pH: 7.6, volatile content: 1.7% by mass) produced by Columbian Chemicals
Carbon black 3: Statex N326 ($N_2SA$: 78 $m^2/g$, DBP oil absorption: 74 $cm^3/100\,g$, pH: 7.6, volatile content: 1.1% by mass) produced by Columbian Chemicals
Carbon black 4: Statex N351H ($N_2SA$: 67 $m^2/g$, DBP oil absorption: 137 $cm^3/100\,g$, pH: 7.8, volatile content: 1.7% by mass) produced by Columbian Chemicals
Carbon black 5: Statex N220 ($N_2SA$: 114 $m^2/g$, DBP oil absorption: 114 $cm^3/100\,g$, pH: 7.5, volatile content: 1.8% by mass) produced by Columbian Chemicals
Silica: VN3 ($N_2SA$: 175 $m^2/g$) produced by EVONIK DEGUSSA
Silane coupling agent: Si75 produced by EVONIK DEGUSSA
C5 petroleum resin: Marukarez T-100AS (softening point: 102° C.) produced by Maruzen Petrochemical
Antioxidant 6PPD: Antigene 6C produced by Sumitomo Chemical Co., Ltd.
Antioxidant TMQ: NOCRAC 224 produced by OUCHI SHINKO CHEMICAL INDUSTRIAL CO., LTD.
Cobalt stearate: cost-F (cobalt content: 9.5% by mass, stearic acid content: 90.5% by mass) produced by Dainippon Ink and Chemicals
Cobalt boron neodecanoate: Dicnate NBC-II (cobalt boron 3 neodecanoate, cobalt content: 22.0% by mass) produced by Dainippon Ink and Chemicals
Stearic acid: TSUBAKI produced by NOF CORPORATION
Zinc oxide: Ginrei R produced by TOHO ZINC CO., LTD.
20% oil-containing insoluble sulfur: MU-CRON OT-20 produced by SHIKOKU CHEMICALS CORPORATION
Vulcanization accelerator TBSI: Santocure TBSI (N-tert-butyl-2-benzothiazolylsulfenimide) produced by Flexsys
Cross-linkable resin 1: SUMIKANOL 620 (modified resorcinol resin (modified resorcinol-formaldehyde condensate)) produced by Taoka Chemical Co., Ltd.
Cross-linkable resin 2: PRX-11061 (high purity cresol resin) produced by SUMITOMO BAKELITE CO., LTD.
Cross-linkable resin 3: PR12686 (cashew oil-modified phenolic resin) produced by SUMITOMO BAKELITE CO., LTD.
Methylene donor: SUMIKANOL 507A (containing 65% by mass of modified etherified methylolmelamine resin (partial condensate of HMMPME) and 35% by mass of silica and oil) produced by Sumitomo Chemical Co., Ltd.
HTS: DURALINK HTS (sodium hexamethylene-1,6-bisthiosulfate dihydrate) produced by Flexsys Examples and Comparative Examples Base Kneading 1

A rubber component, Compound I, and about 30 parts by mass of carbon black were put in a 1.7-L Banbury mixer (KOBE STEEL, LTD.) and kneaded for two minutes. To the mixture, the rest of filler and agents and oil except an organic acid cobalt salt, sulfur, a vulcanization accelerator, and HTS were added. The mixture was further kneaded for three minutes and discharged at 150° C. to give a masterbatch.

Base Kneading 2

To the obtained masterbatch, the organic acid cobalt salt was added. The mixture was kneaded with the Banbury mixer for three minutes and discharged at 130° C. to give a kneaded mass.

Final Kneading

To the kneaded mass, the sulfur, vulcanization accelerator, and HTS were added. The mixture was kneaded with an open roll mill for two minutes and discharged at 105° C. to give an unvulcanized rubber composition.
(Vulcanization)
The obtained unvulcanized rubber composition was press-vulcanized at 150° C. for 30 minutes to give a vulcanized rubber composition.
The following evaluations were performed on the obtained unvulcanized rubber compositions and vulcanized rubber compositions. Tables 3 and 4 show the results.
(Viscoelasticity Test)
The complex modulus of elasticity E*(MPa) and loss tangent tan δ of each vulcanized rubber composition were measured using a viscoelastic spectrometer VES (Iwamoto Seisakusho) at a temperature of 70° C., a frequency of 10 Hz, an initial strain of 10%, and a dynamic strain of 2%. A larger E* indicates higher rigidity and better handling stability. A smaller tan δ indicates less heat build-up and better fuel economy.
(Tensile Test)
A No. 3 dumbbell specimen prepared from each vulcanized rubber composition was subjected to a tensile test at room temperature in conformity with JIS K 6251 "Rubber, vulcanized or thermoplastic—Determination of tensile stress-strain properties", and the elongation at break (EB) (%) (of the fresh sample) was measured. Each vulcanized rubber composition was placed in an oven in an air atmosphere and subjected to oxidative degradation at 80° C. for 168 hours. Then, the elongation at break (EB) (%) (after oxidative degradation) was measured in the same manner. A larger EB indicates better elongation at break (durability).

(Adhesion Test)

A sample for a peel test prepared from each vulcanized rubber composition was subjected to an adhesion test. The rubber coverage after peeling (the proportion of the area covered with rubber based on the peeled surface area of the sample when the rubber was peeled off the steel cords) was measured and scored on a scale of 0 to 5. Also, after each vulcanized rubber composition was subjected to hygrothermal degradation at a temperature of 80° C. and a humidity of 95% for 150 hours, the rubber coverage after peeling was measured in the same manner. Full coverage with rubber was scored 5 and no coverage with rubber was scored 0. A larger score indicates better adhesion to steel cords.

TABLE 3

| | Rubber composition for steel cord topping | | Example | | | | | | | | | |
|---|---|---|---|---|---|---|---|---|---|---|---|---|
| | | | 21 | 22 | 23 | 24 | 25 | 26 | 27 | 28 | 29 | 30 |
| Formulation (part(s) by mass) | NR | | 100 | 100 | 100 | 80 | 80 | 100 | 80 | 70 | 100 | 100 |
| | IR | | — | — | — | 20 | 20 | — | 20 | — | — | — |
| | BR (VCR617) | | — | — | — | — | — | — | — | 30 | — | — |
| | Compound I | | 1 | 1 | 2 | 4 | 8 | 1 | 2 | 1 | 1 | 1 |
| | S-(3-aminopropyl)thiosulfuric acid | | — | — | — | — | — | — | — | — | — | — |
| | Carbon black 1 (N550) | | — | — | — | — | — | — | — | — | 50 | — |
| | Carbon black 2 (N219) | | — | — | — | — | — | — | — | — | — | — |
| | Carbon black 3 (N326) | | 55 | 55 | 55 | 55 | 55 | 15 | 70 | 55 | — | — |
| | Carbon black 4 (N351H) | | — | — | — | — | — | — | — | — | — | — |
| | Carbon black 5 (N220) | | — | — | — | — | — | — | — | — | — | 50 |
| | Silica | | 5 | 5 | 5 | 5 | 5 | 50 | — | 5 | 15 | 5 |
| | Silane coupling agent | | — | — | — | — | — | 4 | — | — | 1.2 | — |
| | C5 petroleum resin | | 2 | 2 | 2 | 2 | 2 | 2 | 2 | 2 | 2 | 2 |
| | Antioxidant 6PPD | | 1 | 1 | 1 | 1 | 1 | 1 | 1 | 1 | 1 | 1 |
| | Antioxidant TMQ | | 1 | 1 | 1 | 1 | 1 | 1 | 1 | 1 | 1 | 1 |
| | Cobalt stearate | | 1 | 1 | 1 | 1 | 1 | 1 | 1 | 1 | 1 | 1 |
| | Cobalt content | | 0.095 | 0.095 | 0.095 | 0.095 | 0.095 | 0.095 | 0.095 | 0.095 | 0.095 | 0.095 |
| | Cobalt boron neodecanoate | | — | — | — | — | — | — | — | — | — | — |
| | Cobalt content | | | | | | | | | | | |
| | Stearic acid | | — | — | — | — | — | — | — | — | — | — |
| | Zinc oxide | | 10 | 10 | 10 | 10 | 10 | 10 | 10 | 10 | 10 | 10 |
| | 20% oil-containing insoluble sulfur | | 7 | 7 | 7 | 7 | 7 | 7 | 6 | 7 | 7 | 7 |
| | Net sulfur content | | 5.6 | 5.6 | 5.6 | 5.6 | 5.6 | 5.6 | 4.8 | 5.6 | 5.6 | 5.6 |
| | Vulcanization accelerator TBSI | | 1 | 1 | 1 | 1 | 1 | 1 | 1 | 1 | 1 | 1 |
| | Cross-linkable resin 1 (SUMIKANOL 620) | | — | — | — | — | — | — | — | — | — | — |
| | Cross-linkable resin 2 (PRX-11061) | | — | — | — | — | — | — | — | — | — | — |
| | Cross-linkable resin 3 (PR12686) | | — | 3 | — | — | — | — | — | — | — | — |
| | Methylene donor | | — | 2 | — | — | — | — | — | — | — | — |
| | HTS | | 0.5 | 0.5 | 0.5 | 0.5 | 0.5 | 0.5 | 0.5 | 0.5 | 0.5 | 0.5 |
| [(Amount of Compound I)/amount of carbon black)] × 100 | | | 1.82 | 1.82 | 3.64 | 7.27 | 14.55 | 6.67 | 2.86 | 1.82 | 2 | 2 |
| Evaluation | E* | target: 6.0-9.0 | 6.52 | 8.51 | 6.59 | 6.64 | 6.78 | 6.05 | 6.75 | 7.55 | 6.71 | 8.51 |
| | tan δ | primary target: ≤0.115, secondary target: ≤0.110 | 0.095 | 0.102 | 0.091 | 0.086 | 0.082 | 0.084 | 0.115 | 0.101 | 0.081 | 0.102 |
| | EB % (fresh sample) | target: >380 | 500 | 425 | 495 | 490 | 480 | 585 | 415 | 410 | 485 | 485 |
| | EB % (after oxidative degradation) | primary target: >230, secondary target: >240 | 310 | 270 | 305 | 305 | 285 | 325 | 240 | 240 | 335 | 245 |
| | Cord adhesion score (fresh sample) | target: ≥4.0 | 5 | 5 | 5 | 5 | 5 | 5 | 4 | 5 | 5 | 5 |
| | Cord adhesion score (after hygrothermal degradation) | target: ≥3.0 | 3 | 4 | 3 | 3 | 3 | 4 | 3 | 4 | 4 | 4 |

TABLE 3-continued

|  |  |  | Example | | | | | | | |
|---|---|---|---|---|---|---|---|---|---|---|
|  | Rubber composition for steel cord topping |  | 31 | 32 | 33 | 34 | 35 | 36 | 37 | 38 |
| Formulation (part(s) by mass) | NR |  | 100 | 100 | 100 | 100 | 100 | 100 | 100 | 100 |
|  | IR |  | — | — | — | — | — | — | — | — |
|  | BR (VCR617) |  | — | — | — | — | — | — | — | — |
|  | Compound I |  | 1 | 1 | 1 | 1 | 1 | 1 | 1 | 1 |
|  | S-(3-aminopropyl) thiosulfuric acid |  | — | — | — | — | — | — | — | — |
|  | Carbon black 1 (N550) |  | — | — | — | — | — | — | — | — |
|  | Carbon black 2 (N219) |  | — | — | — | — | — | — | — | — |
|  | Carbon black 3 (N326) |  | 55 | 55 | 55 | 55 | 55 | 55 | 55 | 55 |
|  | Carbon black 4 (N351H) |  | — | — | — | — | — | — | — | — |
|  | Carbon black 5 (N220) |  | — | — | — | — | — | — | — | — |
|  | Silica |  | 5 | 5 | 5 | 5 | 5 | 5 | 5 | 5 |
|  | Silane coupling agent |  | — | — | — | — | — | — | — | — |
|  | C5 petroleum resin |  | 2 | 2 | 2 | 2 | 2 | 2 | 2 | 2 |
|  | Antioxidant 6PPD |  | 1 | 1 | 1 | 1 | 1 | 1 | 1 | 1 |
|  | Antioxidant TMQ |  | 1 | 1 | 1 | 1 | 1 | 1 | 1 | 1 |
|  | Cobalt stearate |  | 1 | 1 | 0.5 | 2 | 1 | 1 | — | — |
|  | Cobalt content |  | 0.095 | 0.095 | 0.048 | 0.190 | 0.095 | 0.095 |  |  |
|  | Cobalt boron neodecanoate |  | — | — | — | — | — | — | 0.44 | 0.44 |
|  | Cobalt content |  |  |  |  |  |  |  | 0.097 | 0.097 |
|  | Stearic acid |  | — | — | — | — | — | — | 0.7 | 0.7 |
|  | Zinc oxide |  | 10 | 10 | 10 | 10 | 10 | 10 | 10 | 10 |
|  | 20% oil-containing insoluble sulfur |  | 3.75 | 7.5 | 7 | 7 | 7 | 7 | 7 | 7 |
|  | Net sulfur content |  | 3.0 | 6.0 | 5.6 | 5.6 | 5.6 | 5.6 | 5.6 | 5.6 |
|  | Vulcanization accelerator TBSI |  | 1 | 0.7 | 1 | 1 | 1 | 1 | 1 | 1 |
|  | Cross-linkable resin 1 (SUMIKANOL 620) |  | 1.5 | — | — | — | — | 3 | — | 3 |
|  | Cross-linkable resin 2 (PRX-11061) |  | — | — | — | — | 3 | — | — | — |
|  | Cross-linkable resin 3 (PR12686) |  | — | — | — | — | — | — | 3 | — |
|  | Methylene donor |  | 2 | — | — | — | 2 | 2 | 2 | 2 |
|  | HTS |  | 0.5 | 0.5 | 1.5 | 0.5 | 0.5 | 0.5 | 0.5 | 0.5 |
| [(Amount of Compound I)/ amount of carbon black)] × 100 |  |  | 1.82 | 1.82 | 1.82 | 1.82 | 1.82 | 1.82 | 1.82 | 1.82 |
| Evaluation | E* | target: 6.0-9.0 | 7.85 | 6.77 | 6.53 | 6.78 | 8.94 | 7.95 | 8.54 | 8.01 |
|  | tan δ | primary target: ≤0.115, secondary target: ≤0.110 | 0.115 | 0.105 | 0.094 | 0.093 | 0.099 | 0.092 | 0.101 | 0.095 |
|  | EB % (fresh sample) | target: >380 | 515 | 510 | 515 | 475 | 455 | 395 | 445 | 400 |
|  | EB % (after oxidative degradation) | primary target: >230, secondary target: >240 | 360 | 265 | 345 | 245 | 295 | 250 | 300 | 275 |
|  | Cord adhesion score (fresh sample) | target: ≥4.0 | 5 | 5 | 5 | 5 | 5 | 5 | 5 | 5 |
|  | Cord adhesion score (after hygrothermal degradation) | target: ≥3.0 | 3 | 4 | 3 | 4 | 4 | 4 | 5 | 5 |

TABLE 4

|  |  |  | Comparative Example | | | | | | | | | |
|---|---|---|---|---|---|---|---|---|---|---|---|---|
|  | Rubber composition for steel cord topping |  | 10 | 11 | 12 | 13 | 14 | 15 | 16 | 17 | 18 | 19 |
| Formulation (part(s) by mass) | NR |  | 100 | 100 | 100 | 100 | 100 | 80 | 50 | 100 | 100 | 100 |
|  | IR |  | — | — | — | — | — | 20 | — | — | — | — |
|  | BR (VCR617) |  | — | — | — | — | — | — | 50 | — | — | — |
|  | Compound I |  | — | — | 0.05 | 12 | 1 | 2 | 1 | 1 | 1 | — |
|  | S-(3-aminopropyl) thiosulfuric acid |  | — | — | — | — | — | — | — | — | — | 1 |
|  | Carbon black 1 (N550) |  | — | — | — | — | — | 35 | — | — | — | — |

TABLE 4-continued

| Rubber composition for steel cord topping | | Comparative Example | | | | | | | | | |
|---|---|---|---|---|---|---|---|---|---|---|---|
| | | 10 | 11 | 12 | 13 | 14 | 15 | 16 | 17 | 18 | 19 |
| Carbon black 2 (N219) | | — | — | — | — | — | — | — | — | — | — |
| Carbon black 3 (N326) | | 55 | 55 | 55 | 55 | 10 | 40 | 55 | 55 | 55 | 55 |
| Carbon black 4 (N351H) | | — | — | — | — | — | — | — | — | — | — |
| Carbon black 5 (N220) | | — | — | — | — | — | — | — | — | — | — |
| Silica | | 5 | 5 | 5 | 5 | 55 | — | 5 | 5 | 5 | 5 |
| Silane coupling agent | | — | — | — | — | 4.4 | — | — | — | — | — |
| C5 petroleum resin | | 2 | 2 | 2 | 2 | 2 | 2 | 2 | 2 | 2 | 2 |
| Antioxidant 6PPD | | 1 | 1 | 1 | 1 | 1 | 1 | 1 | 1 | 1 | 1 |
| Antioxidant TMQ | | 1 | 1 | 1 | 1 | 1 | 1 | 1 | 1 | 1 | 1 |
| Cobalt stearate | | 1 | 1 | 1 | 1 | 1 | 1 | 1 | 2.5 | 0.5 | 1 |
| Cobalt content | | 0.095 | 0.095 | 0.095 | 0.095 | 0.095 | 0.095 | 0.095 | 0.238 | 0.048 | 0.095 |
| Cobalt boron neodecanoate | | — | — | — | — | — | — | — | — | — | — |
| Cobalt content | | | | | | | | | | | |
| Stearic acid | | — | — | — | — | — | — | — | — | 0.5 | — |
| Zinc oxide | | 10 | 10 | 10 | 10 | 10 | 10 | 10 | 10 | 10 | 10 |
| 20% oil-containing insoluble sulfur | | 7 | 7 | 7 | 7 | 7 | 6 | 7 | 3 | 8 | 7 |
| Net sulfur content | | 5.6 | 5.6 | 5.6 | 5.6 | 5.6 | 4.8 | 5.6 | 2.4 | 6.4 | 5.6 |
| Vulcanization accelerator TBSI | | 1 | 1 | 1 | 1 | 1.2 | 1 | 1 | 1 | 0.5 | 1 |
| Cross-linkable resin 1 (SUMIKANOL 620) | | — | — | — | — | — | — | — | 2 | — | — |
| Cross-linkable resin 2 (PRX-11061) | | — | — | — | — | — | — | — | — | — | — |
| Cross-linkable resin 3 (PR12686) | | — | 3 | — | — | — | — | — | — | — | — |
| Methylene donor | | — | 2 | — | — | — | — | — | 3 | — | — |
| HTS | | 0.5 | 0.5 | 0.5 | 0.5 | 0.5 | 0.5 | 0.5 | 1.5 | 1.5 | 0.5 |
| [(Amount of Compound I)/(amount of carbon black)] × 100 | | — | — | 0.09 | 21.82 | 10 | 2.67 | 1.82 | 1.82 | 1.82 | — |
| Evaluation | E* target: 6.0-9.0 | 6.47 | 8.42 | 6.49 | 6.87 | 6.05 | 6.99 | 7.99 | 6.55 | 7.04 | 6.55 |
| | tan δ primary target: ≤0.115, secondary target: ≤0.110 | 0.122 | 0.134 | 0.119 | 0.079 | 0.119 | 0.135 | 0.118 | 0.125 | 0.107 | 0.101 |
| | EB % (fresh sample) target: >380 | 495 | 410 | 495 | 430 | 525 | 350 | 340 | 575 | 515 | 315 |
| | EB % (after oxidative degradation) primary target: >230, secondary target: >240 | 305 | 270 | 300 | 255 | 230 | 195 | 185 | 375 | 185 | 175 |
| | Cord adhesion score (fresh sample) target: ≥4.0 | 5 | 5 | 5 | 5 | 5 | 4 | 3 | 3 | 5 | 3 |
| | Cord adhesion score (after hygrothermal degradation) target: ≥3.0 | 3 | 4 | 3 | 2 | 2 | 2 | 2 | 2 | 2 | 1 |

Tables 3 and 4 show that, in examples using an isoprene-based rubber, a specific carbon black, an organic acid cobalt salt, and a compound represented by the formula (I) each in a predetermined amount, the fuel economy, durability, and adhesion to steel cords were improved in a balanced manner. The handling stability was also favorable.

(Examples Corresponding to the Third Aspect of the Present Invention)

In the following, agents used in examples and comparative examples shown in Table 5 are listed.

NR: TSR20

BR: BR150B (cis content: 97% by mass) produced by UBE INDUSTRIES, LTD.

Low unsaturation copolymer (1): EP35 (EPDM containing 5-ethylidene-2-norbornene (ENB) as a third diene component, ENB content: 8.1% by mass, iodine value: 26) produced by JSR Low unsaturation copolymer (2): EXXPRO 90-10 (brominated copolymer of isobutylene and p-methylstyrene, p-methylstyrene unit content: 7.5% by mass, bromine content: 2% by mass) produced by Exxon Mobil Corporation Carbon black: ASAHI #60 ($N_2SA$: 40 $m^2/g$, DBP oil absorption: 114 $cm^3/100$ g, pH: 6.8, volatile content: 1.0% by mass) produced by ASAHI CARBON CO., LTD.

Compound (I): (2Z)-4-[(4-aminophenyl)amino]-4-oxo-2-butenoic acid sodium salt (compound represented by the following formula) produced by Sumitomo Chemical Co., Ltd.

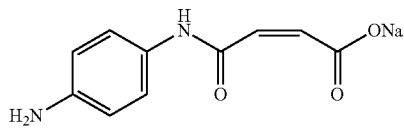

Zinc oxide: Zinc oxide produced by MITSUI MINING & SMELTING CO., LTD.

Antioxidant: OZONONE 6C (N-(1,3-dimethylbutyl)-N'-phenyl-p-phenylenediamine) produced by Seiko Chemical Co., Ltd.

Wax: SUNNOC wax produced by OUCHI SHINKO CHEMICAL INDUSTRIAL CO., LTD.

Oil: PROCESS PX-140 produced by Japan Energy Corporation
Stearic acid: Stearic acid "TSUBAKI" produced by NOF CORPORATION
Sulfur: Powder sulfur produced by TSURUMI CHEMICAL INDUSTRY CO., LTD.
Vulcanization accelerator: NOCCELER NS (N-tert-butyl-2-benzothiazolylsulfenamide) produced by OUCHI SHINKO CHEMICAL INDUSTRIAL CO., LTD.

Examples and Comparative Examples

In accordance with each of the formulations shown in Table 5, materials except sulfur and a vulcanization accelerator were kneaded using a Banbury mixer. To the kneaded mass, the sulfur and vulcanization accelerator were added, and the mixture was then kneaded using an open roll mill to give unvulcanized rubber composition. The unvulcanized rubber composition was vulcanized at 170° C. for 12 minutes to prepare a sample rubber sheet. The following tests were performed on the thus obtained sample rubber sheets.

The sample rubber sheets were evaluated for the following items. Table 5 shows the results.

(Fuel Economy)

The loss tangent (tan δ) of each formulation was measured using a viscoelastic spectrometer VES (Iwamoto Seisakusho) at a temperature of 70° C., an initial strain of 10%, a dynamic strain of 2%, and a frequency of 10 Hz. The measured values of tan δ are expressed as indices (fuel economy indices) relative to that of Comparative Example 20 (=100), according to the following formula. A larger index indicates smaller rolling resistance and better fuel economy.

(Fuel economy index)=(tan δ of Comparative Example 20)/(tan δ of each formulation)×100

(Flex Crack Growth Resistance)

A flex crack growth test was performed on samples prepared from the sample rubber sheets in conformity with JIS K6260 "Rubber, vulcanized or thermoplastic—Determination of flex cracking and crack growth (De Mattia type)". In the test, the sample was bent by performing 70% elongation 1 million times. Then, the length of the formed crack was measured. The measured values (lengths) are expressed as indices (flex crack growth resistance indices) relative to that of Comparative Example 20 (=100), according to the following formula. A larger index indicates more suppression of crack growth and better flex crack growth resistance.

(Flex crack growth resistance index)=(measured value of Comparative Example 20)/(measured value of each formulation)×100

(Crack)

An ozone degradation test was performed at a temperature of 40° C., an ozone concentration of 50 pphm, and 20% elongation in conformity with JIS K6259 (2004). After 50 hours, the degradation state of each sample rubber sheet, that is, the presence of cracks formed was visually observed for evaluation of weather resistance.

TABLE 5

| | | Example | | | | | | | Comparative Example | | | |
|---|---|---|---|---|---|---|---|---|---|---|---|---|
| Rubber composition for sidewall | | 39 | 40 | 41 | 42 | 43 | 44 | 45 | 20 | 21 | 22 | 23 |
| Formulation (part(s) by mass) | NR | 35 | 35 | 35 | 35 | 35 | 35 | 35 | 50 | 35 | 35 | 35 |
| | BR | 35 | 35 | 35 | 35 | 35 | 35 | 35 | 50 | 35 | 35 | 35 |
| | Low unsaturation copolymer (1) | 15 | 15 | 15 | 15 | 15 | 15 | 15 | — | 15 | 15 | 15 |
| | Low unsaturation copolymer (2) | 15 | 15 | 15 | 15 | 15 | 15 | 15 | — | 15 | 15 | 15 |
| | Carbon black | 50 | 50 | 50 | 50 | 50 | 50 | 50 | 50 | 50 | 50 | 50 |
| | Compound (I) | 0.25 | 0.5 | 1 | 2.5 | 5 | 7.5 | 10 | — | — | 0.15 | 12 |
| | Zinc oxide | 3 | 3 | 3 | 3 | 3 | 3 | 3 | 3 | 3 | 3 | 3 |
| | Antioxidant | 3 | 3 | 3 | 3 | 3 | 3 | 3 | 3 | 3 | 3 | 3 |
| | Stearic acid | 1 | 1 | 1 | 1 | 1 | 1 | 1 | 1 | 1 | 1 | 1 |
| | Wax | 1 | 1 | 1 | 1 | 1 | 1 | 1 | 1 | 1 | 1 | 1 |
| | Oil | 5 | 5 | 5 | 5 | 5 | 5 | 5 | 5 | 5 | 5 | 5 |
| | Sulfur | 1.5 | 1.5 | 1.5 | 1.5 | 1.5 | 1.5 | 1.5 | 1.5 | 1.5 | 1.5 | 1.5 |
| | Vulcanization accelerator | 1 | 1 | 1 | 1 | 1 | 1 | 1 | 1 | 1 | 1 | 1 |
| [(Amount of Compound (I))/(amount of carbon black)] × 100 | | 0.5 | 1 | 2 | 5 | 10 | 15 | 20 | — | — | 0.3 | 24 |
| Evaluation | Fuel economy index | 95 | 98 | 102 | 106 | 112 | 117 | 122 | 100 | 81 | 90 | 124 |
| | Flex crack growth resistance index | 100 | 100 | 99 | 98 | 97 | 96 | 94 | 100 | 98 | 99 | 90 |
| | Crack | No crack | No crack | No crack | No crack | No crack | No crack | No crack | (Many) cracks formed | No crack | No crack | No crack |

In Comparative Example 21 in which low unsaturation copolymers were used, the weather resistance was improved but the fuel economy was greatly deteriorated as compared to Comparative Example 20 in which neither low unsaturation copolymers nor the compound (I) were used.

In contrast, in the examples in which low unsaturation copolymers and the compound (I) were used in predetermined amounts, the fuel economy was improved while maintaining the weather resistance and flex crack growth resistance at levels similar to those in Comparative Example 21.

In Comparative Example 22, both low unsaturation copolymers and the compound (I) were used. However, since the amount of the compound (I) was small, the fuel economy was not sufficiently improved.

In Comparative Example 23, since the amount of the compound (I) was large, the flex crack growth resistance was greatly deteriorated.

REFERENCE SIGNS LIST

2. Pneumatic tire
4. Tread portion
12. Breaker
14. Inner liner
15. Band
16. Breaker edge strip
16A. Breaker edge strip
16B. Breaker edge strip 28. Carcass ply
30. Strip layer between breaker and ply
31. Strip on breaker cushion
32. Breaker cushion
44. Inner layer
46. Outer layer

The invention claimed is:

1. A pneumatic tire, comprising:
at least one of a topped steel cord component, a strip adjacent to steel cords, and a tie gum, each formed from a rubber composition comprising:
a rubber component;
a carbon black having a nitrogen adsorption specific surface area of 20 to 130 m²/g;
an organic acid cobalt salt; and
a compound represented by formula (I),

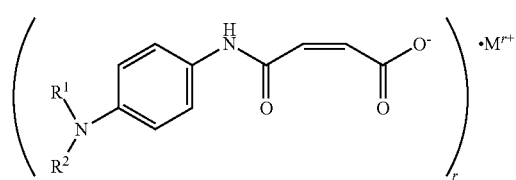
(I)

where $R^1$ and $R^2$ are the same or different from each other and each represent a hydrogen atom, C1-C20 alkyl group, C1-C20 alkenyl group or C1-C20 alkynyl group, $M^{r+}$ represents a metal ion, and r represents a valence of the metal ion,
wherein the rubber component contains 60 to 100% by mass of an isoprene-based rubber based on 100% by mass of the rubber component, an amount of the carbon black is 15 to 70 parts by mass and an amount of the organic acid cobalt salt, calculated as cobalt, is 0.05 to 0.20 parts by mass, each per 100 parts by mass of the rubber component, and an amount of the compound represented by the formula (I) is 0.1 to 20 parts by mass per 100 parts by mass of the carbon black.

2. The pneumatic tire according to claim 1, wherein the rubber composition comprises sulfur in an amount of 2.5 to 6.0 parts by mass per 100 parts by mass of the rubber component.

3. The pneumatic tire according to claim 1, wherein the compound represented by the formula (I) is a compound represented by formula (I-1), (I-2), or (I-3):

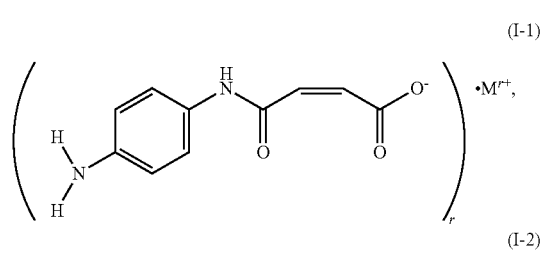
(I-1)

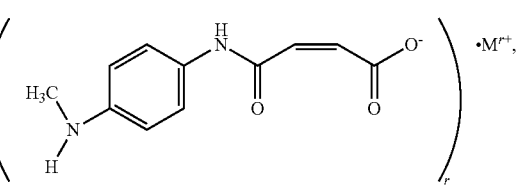
(I-2)

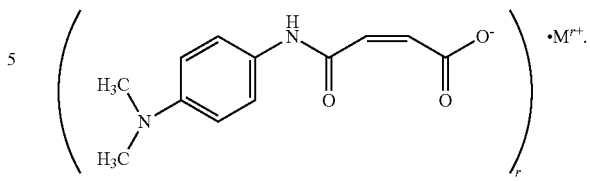
(I-3)

4. The pneumatic tire according to claim 1, wherein the metal ion is a sodium, potassium, or lithium ion.

5. The pneumatic tire according to claim 1, wherein the carbon black has a nitrogen adsorption specific surface area of 60 to 130 m²/g, the amount of the carbon black is 50 to 70 parts by mass per 100 parts by mass of the rubber component, and the amount of the compound represented by the formula (I) is 0.5 to 5 parts by mass per 100 parts by mass of the carbon black.

6. The pneumatic tire according to claim 1, wherein the rubber composition comprises a compound represented by formula, $XO_3S—S—(CH_2)_q—S—SO_3X$, in an amount of 0.1 to 5.0 parts by mass per 100 parts by mass of the rubber component, where q represents an integer of 3 to 10, and X represents lithium, potassium, sodium, magnesium, calcium, barium, zinc, nickel, or cobalt.

7. The pneumatic tire according to claim 1, wherein the rubber composition comprises at least one cross-linkable resin selected from the group consisting of a resorcinol resin, a modified resorcinol resin, a cresol resin, a modified cresol resin, a phenolic resin, and a modified phenolic resin, and at least one methylene donor selected from the group consisting of a partial condensate of hexamethoxymethylolmelamine and a partial condensate of hexamethylol melamine pentamethyl ether, a total amount of the at least one cross-linkable resin is 0.5 to 10 parts by mass and a total amount of the at least one methylene donor is 0.5 to 10 parts by mass, each per 100 parts by mass of the rubber component.

8. The pneumatic tire according to claim 1, wherein the rubber composition comprises a silica having a nitrogen adsorption specific surface area of 50 to 250 m²/g in an amount of 3 to 55 parts by mass per 100 parts by mass of the rubber component.

9. The pneumatic tire according to claim 2, wherein the compound represented by the formula (I) is a compound represented by formula (I-1), (I-2), or (I-3):

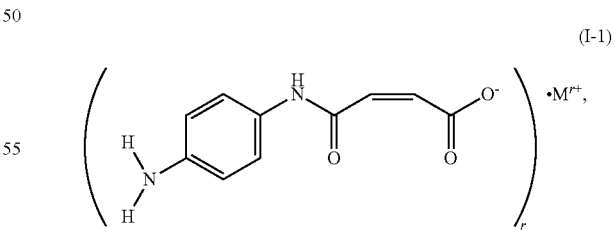
(I-1)

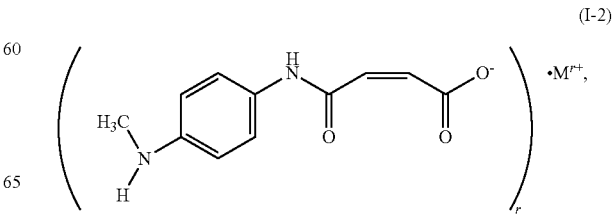
(I-2)

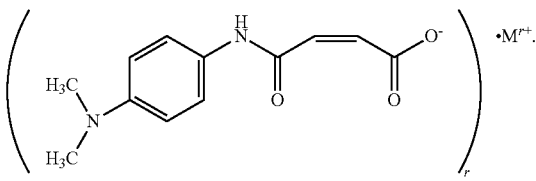

10. The pneumatic tire according to claim 2, wherein the metal ion is a sodium, potassium, or lithium ion.

11. The pneumatic tire according to claim 2, wherein the carbon black has a nitrogen adsorption specific surface area of 60 to 130 m$^2$/g, the amount of the carbon black is 50 to 70 parts by mass per 100 parts by mass of the rubber component, and the amount of the compound represented by the formula (I) is 0.5 to 5 parts by mass per 100 parts by mass of the carbon black.

12. The pneumatic tire according to claim 2, wherein the rubber composition comprises a compound represented by formula, $XO_3S-S-(CH_2)_q-S-SO_3X$, in an amount of 0.1 to 5.0 parts by mass per 100 parts by mass of the rubber component, where q represents an integer of 3 to 10, and X represents lithium, potassium, sodium, magnesium, calcium, barium, zinc, nickel, or cobalt.

13. The pneumatic tire according to claim 2, wherein the rubber composition comprises at least one cross-linkable resin selected from the group consisting of a resorcinol resin, a modified resorcinol resin, a cresol resin, a modified cresol resin, a phenolic resin, and a modified phenolic resin, and at least one methylene donor selected from the group consisting of a partial condensate of hexamethoxymethylolmelamine and a partial condensate of hexamethylol melamine pentamethyl ether, a total amount of the at least one cross-linkable resin is 0.5 to 10 parts by mass and a total amount of the at least one methylene donor is 0.5 to 10 parts by mass, each per 100 parts by mass of the rubber component.

14. The pneumatic tire according to claim 2, wherein the rubber composition comprises a silica having a nitrogen adsorption specific surface area of 50 to 250 m$^2$/g in an amount of 3 to 55 parts by mass per 100 parts by mass of the rubber component.

15. The pneumatic tire according to claim 3, wherein the metal ion is a sodium, potassium, or lithium ion.

16. The pneumatic tire according to claim 3, wherein the carbon black has a nitrogen adsorption specific surface area of 60 to 130 m$^2$/g, the amount of the carbon black is 50 to 70 parts by mass per 100 parts by mass of the rubber component, and the amount of the compound represented by the formula (I) is 0.5 to 5 parts by mass per 100 parts by mass of the carbon black.

17. The pneumatic tire according to claim 3, wherein the rubber composition comprises a compound represented by formula, $XO_3S-S-(CH_2)_q-S-SO_3X$, in an amount of 0.1 to 5.0 parts by mass per 100 parts by mass of the rubber component, where q represents an integer of 3 to 10, and X represents lithium, potassium, sodium, magnesium, calcium, barium, zinc, nickel, or cobalt.

18. The pneumatic tire according to claim 3, wherein the rubber composition comprises at least one cross-linkable resin selected from the group consisting of a resorcinol resin, a modified resorcinol resin, a cresol resin, a modified cresol resin, a phenolic resin, and a modified phenolic resin, and at least one methylene donor selected from the group consisting of a partial condensate of hexamethoxymethylolmelamine and a partial condensate of hexamethylol melamine pentamethyl ether, a total amount of the at least one cross-linkable resin is 0.5 to 10 parts by mass, and a total amount of the at least one methylene donor is 0.5 to 10 parts by mass, each per 100 parts by mass of the rubber component.

19. The pneumatic tire according to claim 1, further comprising:
at least one of a bead apex, a sidewall packing, a base tread, and a breaker cushion, each formed from a rubber composition comprising a rubber component, a carbon black having a nitrogen adsorption specific surface area of 20 to 90 m$^2$/g, sulfur, and a compound represented by the formula (I) where $R^1$ and $R^2$ are the same or different from each other and each represent a hydrogen atom, C1-C20 alkyl group, C1-C20 alkenyl group, or C1-C20 alkynyl group, $M^{r+}$ represents a metal ion, and r represents a valence of the metal ion,
wherein the rubber component in the at least one of a bead apex, a sidewall packing, a base tread, and a breaker cushion contains 60 to 100% by mass of an isoprene-based rubber based on 100% by mass of the rubber component in the at least one of a bead apex, a sidewall packing, a base tread, and a breaker cushion, an amount of the carbon black in the at least one of a bead apex, a sidewall packing, a base tread, and a breaker cushion is 15 to 55 parts by mass and an amount of the sulfur in the at least one of a bead apex, a sidewall packing, a base tread, and a breaker cushion is 1.8 to 3.0 parts by mass, each per 100 parts by mass of the rubber component in the at least one of a bead apex, a sidewall packing, a base tread, and a breaker cushion, and an amount of the compound represented by the formula (I) in the at least one of a bead apex, a sidewall packing, a base tread, and a breaker cushion is 0.1 to 20 parts by mass per 100 parts by mass of the carbon black in the at least one of a bead apex, a sidewall packing, a base tread, and a breaker cushion.

20. The pneumatic tire according to claim 1, further comprising:
a sidewall formed from a rubber composition comprising a rubber component, a carbon black having a nitrogen adsorption specific surface area of 30 to 120 m$^2$/g, and a compound represented by the formula (I) where $R^1$ and $R^2$ are the same or different from each other and each represent a hydrogen atom, C1-C20 alkyl group, C1-C20 alkenyl group, or C1-C20 alkynyl group, $M^{r+}$ represents a metal ion, and r represents a valence of the metal ion,
wherein the rubber component in the sidewall contains, based on 100% by mass of the rubber component, 60 to 75% by mass of a diene rubber and 25 to 40% by mass of a low unsaturation copolymer, an amount of the carbon black in the sidewall is 20 to 60 parts by mass per 100 parts by mass of the rubber component in the sidewall, and an amount of the compound represented by the formula (I) in the sidewall is 0.5 to 20 parts by mass per 100 parts by mass of the carbon black in the sidewall.

* * * * *